(12) United States Patent
England et al.

(10) Patent No.: US 7,107,463 B2
(45) Date of Patent: Sep. 12, 2006

(54) MANIFEST-BASED TRUSTED AGENT MANAGEMENT IN A TRUSTED OPERATING SYSTEM ENVIRONMENT

(75) Inventors: Paul England, Bellevue, WA (US); Marcus Peinado, Bellevue, WA (US); Daniel R. Simon, Redmond, WA (US); Josh D. Benaloh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/206,519

(22) Filed: Aug. 18, 2005

(65) Prior Publication Data

US 2005/0278530 A1   Dec. 15, 2005

Related U.S. Application Data

(63) Continuation of application No. 09/993,370, filed on Nov. 16, 2001.

(51) Int. Cl.
G06F 12/14 (2006.01)
H04L 9/00 (2006.01)

(52) U.S. Cl. .............................. 713/193; 713/176
(58) Field of Classification Search .................. None
See application file for complete search history.

(56) References Cited

U.S. PATENT DOCUMENTS

| | | | |
|---|---|---|---|
| 4,827,508 A | 5/1989 | Shear | |
| 4,969,189 A | 11/1990 | Ohta et al. | |
| 4,977,594 A | 12/1990 | Shear | |
| 5,023,907 A | 6/1991 | Johnson et al. | |
| 5,050,213 A | 9/1991 | Shear | |
| 5,140,634 A | 8/1992 | Guillou et al. | |
| 5,276,311 A | 1/1994 | Hennige | |
| 5,335,334 A | 8/1994 | Takahashi et al. | |
| 5,390,247 A * | 2/1995 | Fischer | 713/176 |
| 5,410,598 A | 4/1995 | Shear | |
| 5,412,717 A * | 5/1995 | Fischer | 713/156 |
| 5,473,690 A | 12/1995 | Grimonprez et al. | |
| 5,473,692 A | 12/1995 | David | |
| 5,491,827 A | 2/1996 | Holtey | |
| 5,544,246 A | 8/1996 | Mandelbaum et al. | |
| 5,557,518 A | 9/1996 | Rosen | |
| 5,654,746 A | 8/1997 | McMullan, Jr. et al. | |
| 5,664,016 A | 9/1997 | Preneel et al. | |
| 5,671,280 A | 9/1997 | Rosen | |
| 5,721,781 A | 2/1998 | Deo et al. | |
| 5,745,886 A | 4/1998 | Rosen | |

(Continued)

FOREIGN PATENT DOCUMENTS

EP   695985   2/1996

(Continued)

OTHER PUBLICATIONS

"Facing an Internet Security Minefield, Microsoft Hardens NT Server Defenses", Young, R., Windows Watcher, Sep. 12, 1997, vol. 7, Issue 9, p1, 6p, 1 chart.

(Continued)

Primary Examiner—Gilberto Barron, Jr.
Assistant Examiner—Minh Dinh
(74) Attorney, Agent, or Firm—Lee & Hayes, PLLC

(57) ABSTRACT

Manifest-based trusted agent management in a trusted operating system environment includes receiving a request to execute a process is received and setting up a virtual memory space for the process. Additionally, a manifest corresponding to the process is accessed, and which of a plurality of binaries can be executed in the virtual memory space is limited based on indicators, of the binaries, that are included in the manifest.

15 Claims, 12 Drawing Sheets

U.S. PATENT DOCUMENTS

| | | | |
|---|---|---|---|
| 5,757,919 | A | 5/1998 | Herbert et al. |
| 5,787,427 | A | 7/1998 | Benantar et al. |
| 5,796,824 | A | 8/1998 | Hasebe et al. |
| 5,812,662 | A | 9/1998 | Hsu et al. |
| 5,812,980 | A | 9/1998 | Asai |
| 5,841,869 | A | 11/1998 | Merklin et al. |
| 5,872,847 | A | 2/1999 | Boyle et al. |
| 5,892,900 | A | 4/1999 | Ginter et al. |
| 5,892,902 | A | 4/1999 | Clark |
| 5,892,904 | A | 4/1999 | Atkinson et al. |
| 5,910,987 | A | 6/1999 | Ginter et al. |
| 5,915,019 | A | 6/1999 | Ginter et al. |
| 5,917,912 | A | 6/1999 | Ginter et al. |
| 5,919,257 | A | 7/1999 | Trostle |
| 5,920,861 | A | 7/1999 | Hall et al. |
| 5,933,498 | A | 8/1999 | Schneck et al. |
| 5,940,504 | A | 8/1999 | Griswold |
| 5,943,422 | A | 8/1999 | Van Wie et al. |
| 5,944,821 | A | 8/1999 | Angelo |
| 5,949,876 | A | 9/1999 | Ginter et al. |
| 5,953,502 | A | 9/1999 | Helbig, Sr. |
| 5,958,050 | A | 9/1999 | Griffin et al. |
| 5,958,051 | A | 9/1999 | Renaud et al. |
| 5,963,980 | A | 10/1999 | Coulier et al. |
| 5,982,891 | A | 11/1999 | Ginter et al. |
| 5,991,399 | A | 11/1999 | Graunke et al. |
| 5,991,876 | A | 11/1999 | Johnson et al. |
| 6,006,332 | A | 12/1999 | Rabne et al. |
| 6,009,274 | A | 12/1999 | Fletcher et al. |
| 6,009,401 | A | 12/1999 | Horstmann |
| 6,026,166 | A | 2/2000 | LeBourgeois |
| 6,032,257 | A | 2/2000 | Olarig et al. |
| 6,038,551 | A | 3/2000 | Barlow et al. |
| 6,073,124 | A | 6/2000 | Krishnan et al. |
| 6,092,189 | A | 7/2000 | Fisher et al. |
| 6,105,072 | A * | 8/2000 | Fischer ............... 719/315 |
| 6,105,137 | A | 8/2000 | Graunke et al. |
| 6,112,181 | A | 8/2000 | Shear et al. |
| 6,118,873 | A | 9/2000 | Lotspiech et al. |
| 6,138,119 | A | 10/2000 | Hall et al. |
| 6,148,387 | A | 11/2000 | Galasso et al. |
| 6,148,402 | A | 11/2000 | Campbell |
| 6,157,721 | A | 12/2000 | Shear et al. |
| 6,175,917 | B1 | 1/2001 | Arrow et al. |
| 6,175,924 | B1 * | 1/2001 | Arnold ............... 713/189 |
| 6,185,678 | B1 | 2/2001 | Arbaugh et al. |
| 6,185,683 | B1 | 2/2001 | Ginter et al. |
| 6,189,100 | B1 | 2/2001 | Barr et al. |
| 6,192,473 | B1 | 2/2001 | Ryan, Jr. et al. |
| 6,212,636 | B1 | 4/2001 | Boyle et al. |
| 6,223,284 | B1 | 4/2001 | Novoa et al. |
| 6,229,894 | B1 | 5/2001 | Van Oorschot et al. |
| 6,230,285 | B1 | 5/2001 | Sadowsky et al. |
| 6,237,786 | B1 | 5/2001 | Ginter et al. |
| 6,240,185 | B1 | 5/2001 | Van Wie et al. |
| 6,253,193 | B1 | 6/2001 | Ginter et al. |
| 6,263,431 | B1 | 7/2001 | Lovelace et al. |
| 6,272,629 | B1 | 8/2001 | Stewart |
| 6,292,569 | B1 | 9/2001 | Shear et al. |
| 6,327,652 | B1 | 12/2001 | England et al. |
| 6,330,588 | B1 | 12/2001 | Freeman |
| 6,338,139 | B1 | 1/2002 | Ando et al. |
| 6,341,373 | B1 | 1/2002 | Shaw |
| 6,363,486 | B1 | 3/2002 | Knapton, III |
| 6,363,488 | B1 | 3/2002 | Ginter et al. |
| 6,367,012 | B1 | 4/2002 | Atkinson et al. |
| 6,381,741 | B1 * | 4/2002 | Shaw ............... 717/168 |
| 6,389,402 | B1 | 5/2002 | Ginter et al. |
| 6,389,537 | B1 | 5/2002 | Davis et al. |
| 6,427,140 | B1 | 7/2002 | Ginter et al. |
| 6,449,367 | B1 | 9/2002 | Van Wie et al. |
| 6,463,535 | B1 | 10/2002 | Drews |
| 6,470,450 | B1 | 10/2002 | Langford et al. |
| 6,477,252 | B1 | 11/2002 | Faber et al. |
| 6,477,648 | B1 | 11/2002 | Schell et al. |
| 6,480,961 | B1 | 11/2002 | Rajasekharan et al. |
| 6,560,706 | B1 | 5/2003 | Carbajal et al. |
| 6,675,382 | B1 | 1/2004 | Foster |
| 6,725,373 | B1 | 4/2004 | Carbajal et al. |
| 6,871,344 | B1 * | 3/2005 | Yoshikawa ............... 717/162 |
| 6,874,143 | B1 * | 3/2005 | Murray et al. ............... 717/173 |
| 6,931,545 | B1 * | 8/2005 | Ta et al. ............... 713/156 |
| 6,978,365 | B1 | 12/2005 | England |
| 7,013,388 | B1 * | 3/2006 | Fisk et al. ............... 713/153 |
| 2001/0025281 | A1 | 9/2001 | Benantar et al. |
| 2002/0007452 | A1 | 1/2002 | Traw et al. |
| 2002/0069365 | A1 | 6/2002 | Howard et al. |
| 2002/0107803 | A1 | 8/2002 | Lisanke et al. |
| 2002/0120936 | A1 | 8/2002 | Del Beccaro et al. |
| 2002/0152173 | A1 | 10/2002 | Rudd |
| 2003/0056102 | A1 * | 3/2003 | Aho et al. ............... 713/176 |

FOREIGN PATENT DOCUMENTS

| | | |
|---|---|---|
| GB | 2260629 | 4/1993 |
| WO | WO 9938070 | 7/1999 |

OTHER PUBLICATIONS

"Phoenix Technologies Partners with Secure Computing in Enterprise Security Marketplace", Jul. 12, 2001, Business Wire, Courtesy of Dialog Text Search, p. 1-2.

Murphy et al., "Preventing Piracy: Authorization Software May Ease Hollywood's Fear of the Net", Internet World Magazine, Apr. 1, 2000, 3 pages.

"Internet Security: SanDisk Products and New Microsoft Technology Provide Copy Protected Music for Internet Music Player Market. (Product Announcement)", Edge: Work Group Computing Report, Apr. 19, 1999, 2 pages.

Arbaugh et al., "A Secure and Reliable Bootstrap Architecture", Distributed Systems Laboratory, Philadelphia, PA, 1997, pp. 65-71.

Lampson et al., "Authentication in Distributed Systems: Theory and Practice", Digital Equipment Corporation, ACM Transactions on Computer Systems, vol. 10, No. 4, Nov. 1992, pp. 265-310.

Clark et al., "Bits: A Smartcard Protected Operating System", Communications of the ACM, vol. 37, No. 11, Nov. 1994, pp. 66-70, 94.

Yee, "Using Secure Coprocessors". School of Computer Science, Carnegie Mellon University, 1994, 104 pages.

Abadi et al., "Authentication and Delegation with Smart-cards", Jul. 30, 1992, 30 pages.

Schneier, B., "Applied Cryptography", Applied Cryptography. Protocols, Algorithms, and Source Code in C, 1996. pp. 574-577.

"Secure Management Information Exchange", Bhatti et al., Journal of Network and Systems Management, vol. 4, No. 3, 1996, pp. 251-277.

"Security Enhancement for the Simple Authentication Key Agreement Algorithm", Lin et al., IEEE 2000, pp. 113-155.

"Techniques for secure execution of mobile code: a review", J.M. Mas-Ribes and Benoit Macq, Ann. Telecommun., 55, n 7-8, 2000, pp. 1-9.

"Security Agility for Dynamic Execution Environments", Petkac et al., IEEE 1999, pp. 377-390.

Dell et al., "Manifest Format", 1996, Sun Microsystems, Retrieved from the Internet at http://www.useractive.com/java/docs/guide/jar/manifest/html pp. 1-8.

White Paper-"Code Signing Digital IDs for Sun Java Signing", VeriSign, Retrieved from the Internet at http://www.ins(-Informatic. pt/v20/cid/biblioteca_digital/seguranca/javaSigning.pdf.

* cited by examiner

MANIFEST-BASED TRUSTED AGENT MANAGEMENT IN A TRUSTED OPERATING SYSTEM ENVIRONMENT

RELATED APPLICATIONS

This application is a continuation of U.S. patent application Ser. No. 09/993,370, filed Nov. 16, 2001, which is hereby incorporated by reference herein.

TECHNICAL FIELD

This invention relates to trusted environments generally, and more particularly to manifest-based trusted agent management in a trusted operating system environment.

BACKGROUND

Having people be able to trust computers has become an increasingly important goal. This trust generally focuses on the ability to trust the computer to use the information it stores or receives correctly. Exactly what this trust entails can vary based on the circumstances. For example, multimedia content providers would like to be able to trust computers to not improperly copy their content. By way of another example, users would like to be able to trust their computers to forward confidential financial information (e.g., bank account numbers) only to appropriate destinations (e.g., allow the information to be passed to their bank, but nowhere else). Unfortunately, given the generally open nature of most computers, a wide range of applications can be run on most current computers without the user's knowledge, and these applications can compromise this trust (e.g., forward the user's financial information to some other destination for malicious use).

To address these trust issues, different mechanisms have been proposed (and new mechanisms are being developed) that allow a computer or portions thereof to be trusted. Generally, these mechanisms entail some sort of authentication procedure where the computer can authenticate or certify that at least a portion of it (e.g., certain areas of memory, certain applications, etc.) are at least as trustworthy as they present themselves to be (e.g., that the computer or application actually is what it claims to be). In other words, these mechanisms prevent a malicious application from impersonating another application (or allowing a computer to impersonate another computer). Once such a mechanism can be established, the user or others (e.g., content providers) can make a judgment as to whether or not to accept a particular platform and application as trustworthy (e.g., a multimedia content provider may accept a particular application as being trustworthy, once the computer can certify to the content provider's satisfaction that the particular application is the application it claims to be).

Oftentimes, components and modules of an application are allowed to be changed (e.g., in response to user preferences) and/or upgraded fairly frequently. For example, applications frequently include various dynamic link libraries (DLL's), plug-ins, etc. and allow for different software configurations, each of which can alter the binaries which execute as the application. Currently, it is difficult (if possible at all) in many systems to allow for such changes and differing configurations of applications, while at the same time maintaining the trustworthiness of the computer. Thus, it would be beneficial to have a security model that allows for these differences and changes, while at the same time maintaining the trustworthiness of the computer. The manifest-based trusted agent management in a trusted operating system environment described herein provides such a security model.

SUMMARY

Manifest-based trusted agent management in a trusted operating system environment is described herein.

According to one aspect, a request to execute a process is received and a virtual memory space for the process is set up. A manifest corresponding to the process is accessed, and which of a plurality of binaries can be executed in the virtual memory space is limited based on indicators, of the binaries, that are included in the manifest.

According to another aspect, a manifest includes a first portion including data representing a unique identifier of the trusted application, a second portion including data indicating whether a particular one or more binaries can be loaded into the process space for the trusted application, and a third portion derived from the data in both the first portion and the second portion by generating a digital signature over the first and second portions. The manifest can also include a portion that includes data representing a list of one or more export statements that allow a secret associated with the trusted application to be exported to another trusted application, a portion that includes data representing a set of properties corresponding to the data structure, and a portion that includes data representing a list of entry points into the executing trusted application.

DETAILED DESCRIPTION

As used herein, code being "trusted" refers to code that is immutable in nature and immutable in identity. Code that is trusted is immune to being tampered with by other parts (e.g. code) of the computer and it can be reliably and unambiguously identified. In other words, any other entity or component asking "who is this code" can be told "this is code xyz", and can be assured both that the code is indeed code xyz (rather than some imposter) and that code xyz is unadulterated. Trust does not deal with any quality or usefulness aspects of the code—only immutability of nature and immutability of identity.

Additionally, the execution environment of the trusted code effects the overall security. The execution environment includes the machine or machine class on which the code is executing.

General Operating Environment

Figure 1:
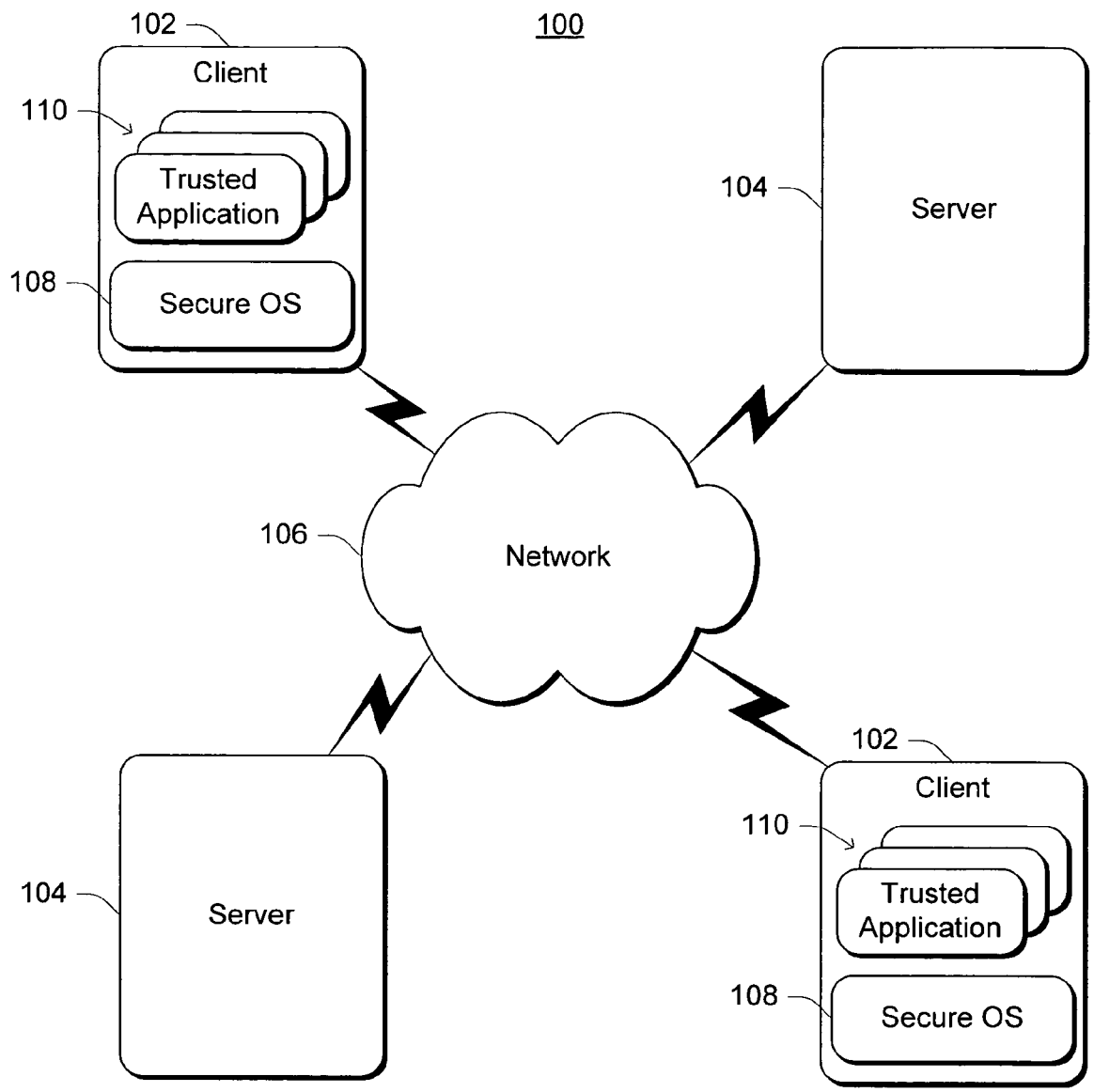
FIG. 1 illustrates an exemplary trusted operating system environment.

FIG. 1 illustrates an exemplary trusted operating system environment 100.

In environment 100, multiple client computing devices 102 are coupled to multiple server computing devices 104 via a network 106. Network 106 is intended to represent any of a wide variety of conventional network topologies and types (including wired and/or wireless networks), employing any of a wide variety of conventional network protocols (including public and/or proprietary protocols). Network 106 may include, for example, the Internet as well as possibly at least portions of one or more local area networks (LANs).

Computing devices 102 and 104 can each be any of a wide variety of conventional computing devices, including desktop PCs, workstations, mainframe computers, Internet appliances, gaming consoles, handheld PCs, cellular telephones, personal digital assistants (PDAs), etc. One or more of devices 102 and 104 can be the same types of devices, or alternatively different types of devices.

Each of client computing devices 102 includes a secure operating system it (OS) 108. Secure operating system 108 is designed to provide a level of trust to users of client devices 102 as well as server devices 104 that are in communication with client devices 102 via a network 106. Secure operating system 108 can be designed in different ways to provide such trust, as discussed in more detail below. By providing this trust, the user of device 102 and/or the server devices 104 can be assured that secure operating system 108 will use data appropriately and take various measures to protect that data.

Each of client computing devices 102 may also execute one or more trusted applications (also referred to as trusted agents or processes) 110. Each trusted application is software (or alternatively firmware) that is made up of multiple instructions to be executed by a processor(s) of device 102. Oftentimes a trusted application is made up of multiple individual files (also referred to as binaries) that together include the instructions that comprise the trusted application.

One example of the usage of environment 100 is to maintain rights to digital content, often referred to as "digital rights management". A client device 102 may obtain digital content (e.g., a movie, song, electronic book, etc.) from a server device 104. Secure operating system 108 on client device 102 assures server device 104 that operating system 108 will not use the digital content inappropriately (e.g., will not communicate copies of the digital content to other devices) and will take steps to protect the digital content (e.g., will not allow unauthorized applications to access decrypted content).

Another example of the usage of environment 100 is for electronic commerce (also referred to as e-commerce). A client device 102 may communicate with a server device 104 and exchange confidential financial information (e.g., to purchase or sell a product or service, to perform banking operations such as withdrawal or transfer of funds, etc.). Secure operating system 108 on the client device 102 assures server device 104, as well as the user of client device 102, that it will not use the financial information inappropriately (e.g., will not steal account numbers or funds) and will take steps to protect the financial information (e.g., will not allow unauthorized applications to access decrypted content).

Secure operating system 108 may be employed to maintain various secrets by different trusted applications 110 executing on client devices 102. For example, confidential information may be encrypted by a trusted application 110 and a key used for this encryption securely stored by secure operating system 108. By way of another example, the confidential information itself may be passed to secure operating system 108 for secure storage.

There are two primary functions that secure operating system 108 provides: (1) the ability to securely store secrets for trusted applications 110; and (2) the ability to allow trusted applications 110 to authenticate themselves. The secure storage of secrets allows trusted applications 110 to save secrets to secure operating system 108 and subsequently retrieve those secrets so long as neither the trusted application 110 nor operating system 108 has been altered. If either the trusted application 110 or the operating system 108 has been altered (e.g., by a malicious user or application in an attempt to subvert the security of operating system 108), then the secrets are not retrievable by the altered application and/or operating system. A secret refers to any type of data that the trusted application does not want to make publicly available, such as an encryption key, a user password, a password to access a remote computing device, digital content (e.g., a Movie, a song, an electronic book, etc.) or a key(s) used to encrypt the digital content, financial data (e.g., account numbers, personal identification numbers (PINs), account balances, etc.), and so forth.

The ability for a trusted application 110 to authenticate itself allows the trusted application to authenticate itself to a third party (e.g., a server device 104). This allows, for example, a server device 104 to be assured that it is communicating digital content to a trusted content player executing on a trusted operating system, or for the server device 104 to be assured that it is communicating with a trusted e-commerce application on the client device rather than with a virus (or some other malicious or untrusted application).

Various concerns exist for the upgrading, migrating, and backing up of various components of the client devices 102. As discussed in more detail below, the security model discussed herein provides for authentication and secret storage in a trusted operating system environment, while at the same time allowing one or more of:

secure operating system upgrades
    migration of secrets to other computing devices
    backup of secrets
    trusted application upgrades Reference is made herein to encrypting data using a key. Generally, encryption refers to a process in which the data to be encrypted (often referred to is plaintext) is input to an encryption algorithm that operates, using a key (commonly referred to as the encryption key), on the plaintext to generate ciphertext. Encryption algorithms are designed so that it is extremely difficult to re-generate the plaintext without knowing a decryption key (which may be the same as the encryption key, or alternatively a different key). A variety of conventional encryption algorithms can be used, such as DES (Data Encryption Standard), RSA (Rivest, Shamir, Adelman), RC4 (Rivest Cipher 4), RC5 (Rivest Cipher 5), etc.

One type of encryption uses a public-private key pair. The public-private key pair includes two keys (one private key and one public key) that are selected so that it is relatively straight-forward to decrypt the ciphertext if both keys are known, but extremely difficult to decrypt the ciphertext if only one (or neither) of the keys is known. Additionally, the encryption algorithm is designed and the keys selected such that it is extremely difficult to determine one of the keys based on the ciphertext alone and/or only one key.

The owner of a public-private key pair typically makes its public key publicly available, but keeps its private key secret. Any party or component desiring to encrypt data for the owner can encrypt the data using the owner's public key, thus allowing only the owner (who possesses the corresponding private key) to readily decrypt the data. The key pair can also be used for the owner to digitally sign data. In order to add a digital signature to data, the owner encrypts the data using the owner's private key and makes the resultant ciphertext available with the digitally signed data. A recipient of the digitally signed data can decrypt the ciphertext using the owner's public key and compare the decrypted data to the data sent by the owner to verify that the owner did in fact generate that data (and that is has not been altered by the owner since being generated).

The discussions herein assume a basic understanding of cryptography. For a basic introduction of cryptography, the reader is directed to a text written by Bruce Schneier and entitled "Applied Cryptography: Protocols, Algorithms, and Source Code in C," published by John Wiley & Sons with copyright 1994 (or second edition with copyright 1996).

Exemplary Computing Device Architectures

Secure operating system 108 of FIG. 1 includes at least a portion that is trusted code, referred to as the "trusted core". The trusted core may be a full operating system, a microkernel, a Hypervisor, or some smaller component that provides specific security services.

Figure 2:
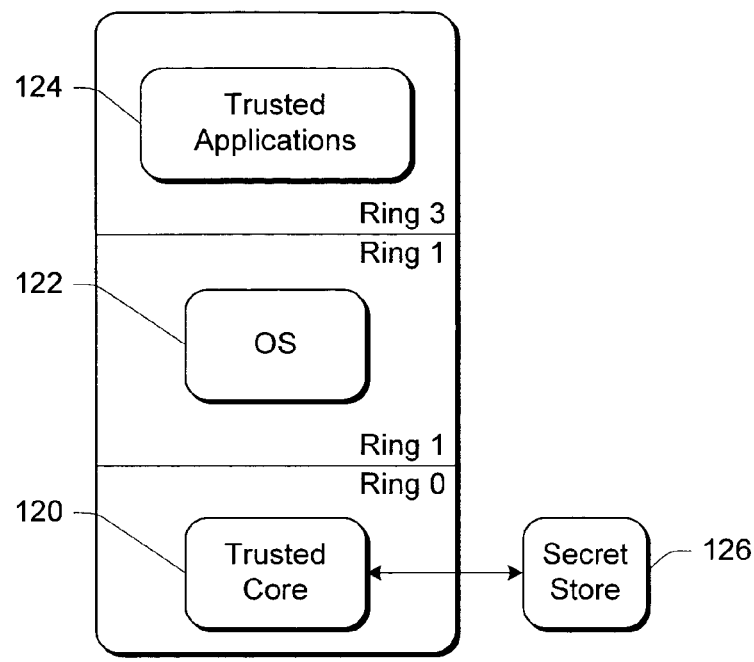
FIG. 2 illustrates one exemplary architecture that can be implemented on a client computing device.

FIG. 2 illustrates one exemplary architecture that can be implemented on a client computing device 102. In FIG. 2, the trusted core is implemented by taking advantage of different privilege levels of the processor(s) of the client computing device 102 (e.g., referred to as "rings" in an x86 architecture processor). In the illustrated example, these privilege levels are referred to as rings, although alternate implementations using different processor architectures may use different nomenclature. The multiple rings provide a set of prioritized levels that software can execute at, often including 4 levels (Rings 0, 1, 2, and 3). Ring 0 is typically referred to as the most privileged ring. Software processes executing in Ring 0 can typically access more features (e.g., instructions) than processes executing in less privileged rings.

Furthermore, a processor executing in a particular ring cannot alter code or data in a higher priority ring. In the illustrated example, a trusted core 120 executes in Ring 0, while an operating system 122 executes in Ring I and trusted applications 124 execute in Ring 3. Thus, trusted core 120 operates at a more privileged level and can control the execution of operating system 122 from this level. Additionally, the code and/or data of trusted core 120 (executing in Ring 0) cannot be altered directly by operating system 122 (executing in Ring 1) or trusted applications 124 (executing in Ring 3). Rather, any such alterations would have to be made by the operating system 122 or a trusted application 124 requesting trusted core 120 to make the alteration (e.g., by sending a message to trusted core 120, invoking a function of trusted core 120, etc.).

Trusted core 120 also maintains a secret store 126 where secrets passed to and encrypted by trusted core 120 (e.g., originating with trusted applications 124, OS 122, or trusted core 120) are securely stored. The storage of secrets is discussed in more detail below.

A cryptographic measure of trusted core 120 is also generated when it is loaded into the memory of computing device 102 and stored in a digest register of the hardware. In one implementation, the digest register is designed to be written to only once after each time the computing device is reset, thereby preventing a malicious user or application from overwriting the digest of the trusted core. This cryptographic measure can be generated by different components, such as a security processor of computing device 102, a trusted BIOS, etc. The cryptographic measure provides a small (relative to the size of the trusted core) measure of the trusted core that can be used to verify the trusted core that is loaded. Given the nature of the cryptographic measure, it is most likely that any changes made to a trusted core (e.g., to circumvent its trustworthiness) will be reflected in the cryptographic measure, so that the altered core and the original core will produce different cryptographic measures. This cryptographic measure is used as a basis for securely storing data, as discussed in more detail below.

A variety of different cryptographic measures can be used. One such cryptographic measure is a digest—for ease of explanation the cryptographic measure will be discussed primarily herein as a digest, although other measures could alternatively be used. The digest is calculated using a one-way hashing operation, such as SHA-1 (Secure Hash Algorithm 1), MD4 (Message Digest 4), MD5 (Message Digest 5), etc. The cryptographic digest has the property that it is extremely difficult to find a second pre-image (in this case, a second trusted core) that when digested produces the same hash value. Hence the digest register contains a value that can be considered to uniquely represent the trusted core in use.

An alternative cryptographic measure to a digest, is the public key of a properly formed certificate on the digest. Using this technique, a publisher can generate a sequence of trusted-cores that are treated as identical or equivalent by the platform (e.g., based on the public key of the publisher). The platform refers to the basic hardware of the computing device (e.g., processor and chipset) as well as the firmware associated with this hardware (e.g., microcode in the processor and/or chipset).

Alternatively, the operating system may be separated into a memory manager component that operates as trusted core 120 with the remainder of the operating system operating as OS 122. The trusted core 120 then controls all page maps and is thus able to shield trusted agents executing in Ring 3 from other components (including OS 122). In this alternative, additional control is also added to protect the trusted core 120 from other busmasters that do not obey ring privileges.

Figure 3:
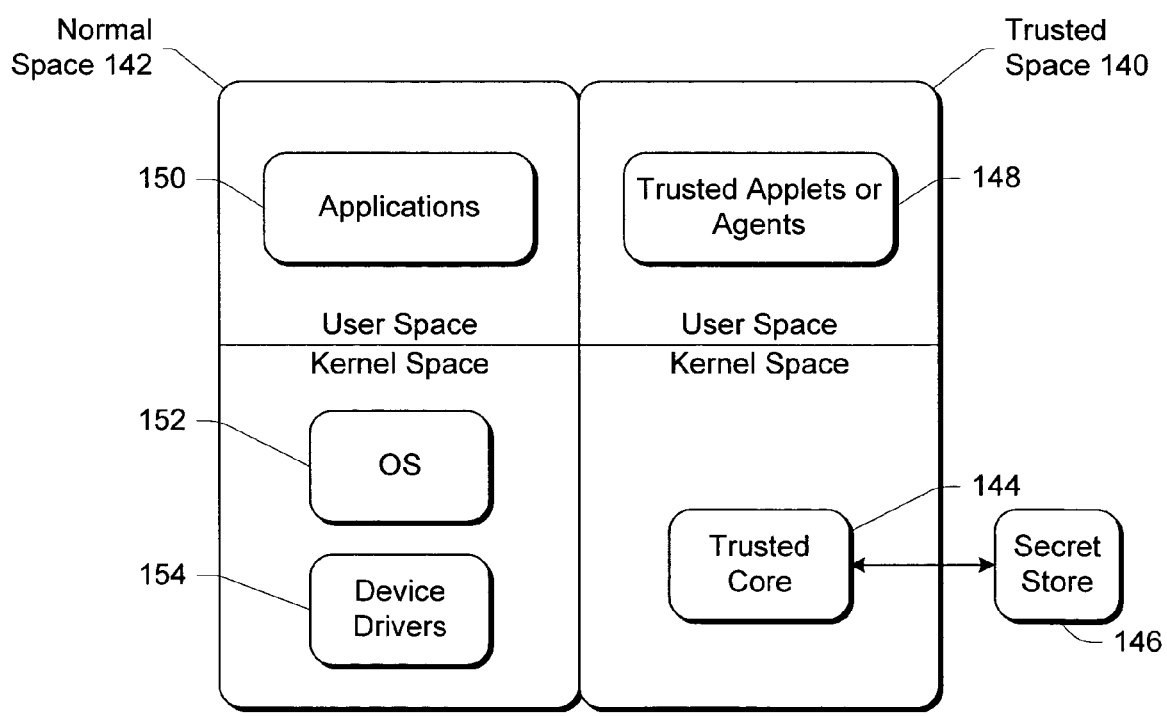
FIG. 3 illustrates another exemplary architecture that can be used with the invention.

FIG. 3 illustrates another exemplary architecture that can be used with the invention. In FIG. 3, the trusted core is implemented by establishing two separate "spaces" within a client computing device 102 of FIG. 1: a trusted space 140 (also referred to as a protected parallel area, or curtained memory) and a normal (untrusted) space 142. These spaces can be, for example, one or more address ranges within computing device 102. Both trusted space 140 and normal space 142 include a user space and a kernel space, with the trusted core 144 and secret store 146 being implemented in the kernel space of trusted space 140. A cryptographic measure, such as a digest, of trusted core 144 is also generated and used analogous to the cryptographic measure of trusted core 120 discussed above.

A variety of trusted applets, trusted applications, and/or trusted agents 148 can execute within the user space of trusted space 140, under the control of trusted core 144. However, any application 150, operating system 152, or device driver 154 executing in normal space 142 is prevented, by trusted core 144, from accessing trusted space 140. Thus, no alterations can be made to trusted applications or data in trusted space 140 unless approved by trusted core 144.

Additional information regarding these computing device architectures can be found in the following four U.S. Patent Applications, each of which is hereby incorporated by reference: U.S. patent application Ser. No. 09/227,611, entitled "Loading and Identifying a Digital Rights Management Operating System", which was filed Jan. 8, 1999, in the names of Paul England et al.; U.S. patent application Ser. No. 09/227,561, entitled "Digital Rights Management Operating System", which was filed Jan. 8, 1999, in the names of Paul England et al.; U.S. patent application Ser. No. 09/287,393, entitled "Secure Execution of Program Code", which was filed Apr. 6, 1999, in the names of Paul England et al.; and U.S. patent application Ser. No. 09/287,698, entitled "Hierarchical Trusted Code for Content Protection in Computers", which was filed Apr. 6, 1999, in the name of Paul England.

For ease of explanation, the digest of a trusted core is discussed herein as a single digest of the trusted core. However, in different implementations, the digest may be made up of multiple parts. By way of example, the boot process may involve a trusted BIOS loading a platform portion of the trusted core and generating a digest of the platform portion. The platform portion in turn loads an operating system portion of the trusted core and generates a digest for the operating system portion. The operating system portion in turn loads a gatekeeper portion of the trusted core and generates a digest for the gatekeeper portion. A composite of these multiple generated digests is used as the digest of the trusted core. These multiple generated digests may be stored individually in separate digest registers with the composite of the digests being the concatenation of the different register values. Alternatively, each new digest may be used to generate a new digest value by generating a cryptographic hash of the previous digest value concatenated with the new digest—the last new digest value generated (e.g., by the operating system portion) is stored in a single digest register.

Primitive Operations

Two fundamental types of primitive operations are supported by the hardware and software of a client computing device 102 of FIG. 1. These fundamental types are secret storage primitives and authentication primitives. The hardware of a device 102 makes these primitive operations available to the trusted core executing on the device 102, and the trusted core makes variations of these primitive operations available to the trusted applications executing on the device 102.

Two secret storage primitive operations are supported: Seal and Unseal. The Seal primitive operation uses at least two parameters—one parameter is the secret that is to be securely stored and the other parameter is an identification of the module or component that is to be able to subsequently retrieve the secret. In one implementation, the Seal primitive operation provided by the hardware of client computing device 102 (e.g., by a cryptographic or security processor of device 102) takes the following form:

Seal (secret, digest_to_unseal, current_digest)

where secret represents the secret to be securely stored, digest_to_unseal represents a cryptographic digest of the trusted core that is authorized to subsequently retrieve the secret, and current_digest represents a cryptographic digest of the trusted core at the time the Seal operation was invoked. The current_digest the current_digest is automatically added by the security processor as the value in the digest register of the device 102 rather than being explicitly settable as an external parameter (thereby removing the possibility that the module or component invoking the Seal operation provides an inaccurate current_digest).

When the Seal primitive operation is invoked, the security processor encrypts the parameters provided (e.g., secret, digest_to_unseal, and current_digest). Alternatively, the digest_to_unseal (and optionally the current_digest as well) may not be encrypted, but rather stored in non-encrypted form and a correspondence maintained between the encrypted secret and the digest_to_unseal. By not encrypting the digest_to_unseal, comparisons performed in response to the Unseal primitive operation discussed below can be carried out without decrypting the ciphertext.

The security processor can encrypt the data of the Seal operation in any of a wide variety of conventional manners. For example, the security processor may have an individual key that it keeps secret and divulges to no component or module, and/or a public-private key pair. The security processor could use the individual key, the public key from its public-private key pair, or a combination thereof. The security processor can use any of a wide variety of conventional encryption algorithms to encrypt the data. The resultant ciphertext is then stored as a secret (e.g., in secret store 126 of FIG. 2 or 146 of FIG. 3).

The Unseal primitive operation is the converse of the Seal primitive operation, and takes as a single parameter the ciphertext produced by an earlier Seal operation. The security processor obtains the cryptographic digest of the trusted core currently executing on the computing device and also obtains the digest_to_unseal. If the digest_to_unseal exists in a non-encrypted state (e.g., associated with the ciphertext, but not encrypted as part of the ciphertext), then this non-encrypted version of the digest_to_unseal is obtained by the security processor. However, if no such non-encrypted version of the digest_to_unseal exists, then the security processor decrypts the ciphertext to obtain the digest_to_unseal.

Once the digest_to_unseal and the cryptographic digest of the trusted core currently executing on the computing device are both obtained, the security processor compares the two digests to determine if they are the same. If the two digests are identical, then the trusted core currently executing on the computing device is authorized to retrieve the secret, and the security processor returns the secret (decrypting the secret, if it has not already been decrypted) to the component or module invoking the Unseal operation. However, if the two digests are not identical, then the trusted core currently executing on the computing device is not authorized to retrieve the secret and the security processor does not return the secret (e.g., returning a "fail" notification). Note that failures of the Unseal operation will also occur if the ciphertext was generated on a different platform (e.g., a computing device using a different platform firmware) using a different encryption or integrity key, or if the ciphertext was generated by some other process (although the security processor may decrypt the secret and make it available to the trusted core, the trusted core would not return the secret to the other process).

Two authentication primitive operations are also supported: Quote and Unwrap (also referred to as PK_Unseal). The Quote primitive takes one parameter, and causes the security processor to generate a signed statement associating the supplied parameter with the digest of the currently running trusted core. In one implementation, the security processor generates a certificate that includes the public key of a public-private key pair of the security processor as well as the digest of the currently running trusted core and the external parameter. The security processor then digitally signs this certificate and returns it to the component or module (and possibly ultimately to a remote third party), which can use the public key in the certificate to verify the signature.

The Unwrap or PK_Unseal primitive operation, has ciphertext as its single parameter. The party invoking the Unwrap or PK_Unseal operation initially generates a structure that includes two parts—a secret and a digest_to_unseal. The party then encrypts this structure using the public key of a public-private key pair of the security processor on the client computing device 102. The security processor responds to the Unwrap or PK_Unseal primitive operation by using its private key of the public-private key pair to decrypt the ciphertext received from the invoking party. Similar to the Unseal primitive operation discussed above, the security processor compares the digest of the trusted core currently running on the client computing device 102 to the digest_to_unseal from the decrypted ciphertext. If the two digests are identical, then the trusted core currently executing on the computing device is authorized to retrieve the secret, and the security processor provides the secret to the trusted core. However, if the two digests are not identical, then the trusted core currently executing on the computing device is not authorized to retrieve the secret and the security processor does not provide the secret to the trusted core (e.g., instead providing a "fail" notification).

Both quote and unwrap can be used as part of a cryptographic protocol that allows a remote party to be assured that he is communicating with a trusted platform running a specific piece of trusted core software (by knowing its digest).

Gatekeeper Storage Key and Trusted Core Updates

Secret use and storage by trusted applications executing on a client computing device 102 of FIG. 1 is based on a key generated by the trusted core, referred to as the gatekeeper storage key (GSK). The gatekeeper storage key is used to facilitate upgrading of the secure part of the operating system (the trusted core) and also to reduce the frequency with which the hardware Seal primitive operation is invoked. The gatekeeper storage key is generated by the trusted core and then securely stored using the Seal operation with the digest of the trusted core itself being the digest_to_unseal (this is also referred to as sealing the gatekeeper storage key to the trusted core with the digest digest_to_unseal). Securely storing the gatekeeper storage key using the Seal operation allows the trusted core to retrieve the gatekeeper storage key when the trusted core is subsequently rebooted (assuming that the trusted core has not been altered, and thus that its digest has not been altered). The trusted core should not disclose the GSK to any other parties, apart from under the strict rules detailed below.

The gatekeeper storage key is used as a root key to securely store any trusted application, trusted core, or other operating system secrets. A trusted application desiring to store data as a secret invokes a software implementation of Seal supported by the trusted core (e.g., exposed by the trusted core via an application programming interface (API)). The trusted core encrypts the received trusted application secret using an encryption algorithm that uses the gatekeeper storage key as its encryption key. Any of a wide variety of conventional encryption algorithms can be used. The encrypted secret is then stored by the trusted core (e.g., in secret store 126 of FIG. 2, secret store 146 of FIG. 3, or alternatively elsewhere (typically, but not necessarily, on the client device)).

When the trusted application desires to subsequently retrieve the stored secret, the trusted application invokes an Unseal operation supported by the trusted core (e.g., exposed by the trusted core via an API) and based on the GSK as the encryption key. The trusted core determines whether to allow the trusted application to retrieve the secret based on information the trusted core has about the trusted application that saved the secret as well as the trusted application that is requesting the secret. Retrieval of secrets is discussed in more detail below with reference to manifests.

Thus, the gatekeeper storage key allows multiple trusted application secrets to be securely stored without the Seal operation of the hardware being invoked a corresponding number of times. However, security of the trusted application secrets is still maintained because a mischievous trusted core will not be able to decrypt the trusted application secrets (it will not be able to recover the gatekeeper storage key that was used to encrypt the trusted application secrets, and thus will not be able to decrypt the encrypted trusted application secrets).

Figure 4:
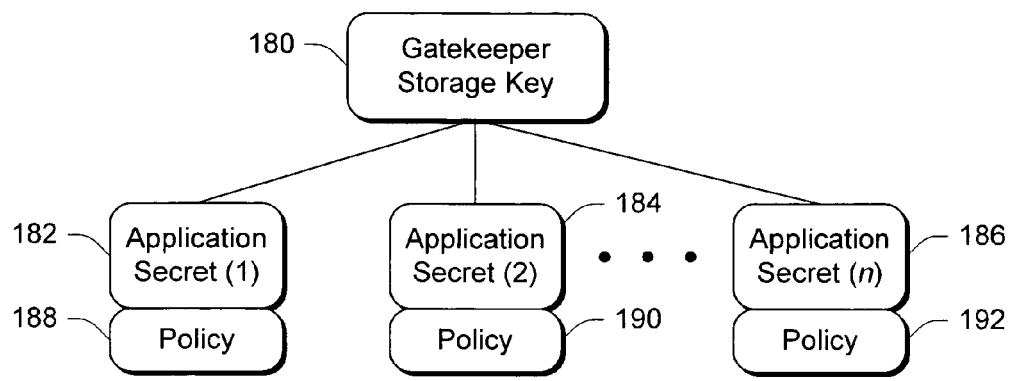
FIG. 4 illustrates an exemplary relationship between a gatekeeper storage key and trusted application secrets.

FIG. 4 illustrates an exemplary relationship between the gatekeeper storage key and trusted application secrets. A single gatekeeper storage key 180 is a root key and multiple (n) trusted application secrets 182, 184, and 186 are securely stored based on key 180. Trusted application secrets 182, 184, and 186 can be stored by a single trusted application or alternatively multiple trusted applications. Each trusted application secret 182, 184, and 186 optionally includes a policy statement 188, 190, and 192, respectively. The policy statement includes policy information regarding the storage, usage, and/or migration conditions that the trusted application desires to be imposed on the corresponding trusted application secret.

Figure 5:
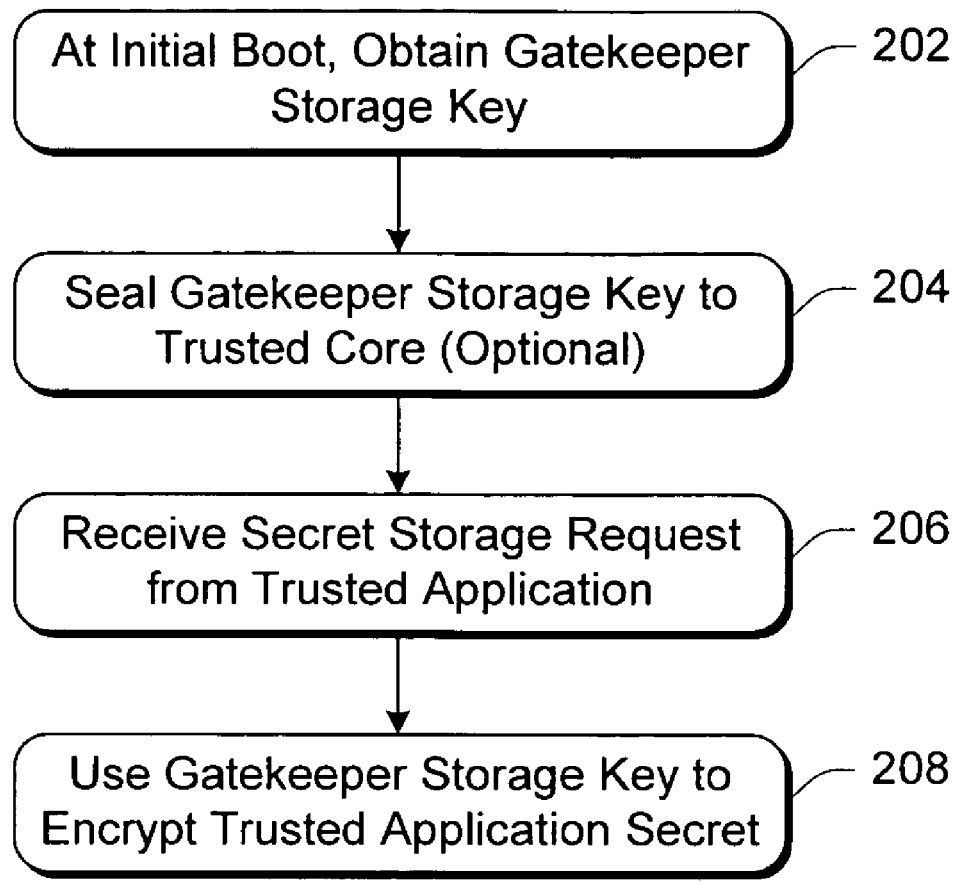
FIG. 5 illustrates an exemplary process for securely storing secrets using a gatekeeper storage key.

FIG. 5 illustrates an exemplary process 200 for securely storing secrets using a gatekeeper storage key. The process of FIG. 5 is carried out by the trusted core of a client computing device, and may be performed in software.

The first time the trusted core is booted, a gatekeeper storage key is obtained (act 202) and optionally sealed, using a cryptographic measure of the trusted core, to the trusted core (act 204). The gatekeeper storage key may not be sealed, depending on the manner in which the gatekeeper storage keys are generated, as discussed in more detail below. Eventually, a request to store a secret is received by the trusted core from a trusted application (act 206). The trusted core uses the gatekeeper storage key to encrypt the trusted application secret (act 208), and stores the encrypted secret.

The gatekeeper storage key can be generated in a variety of different manners. In one implementation, the trusted core generates a gatekeeper storage key by generating a random number (or pseudo-random number) and uses a seal primitive to save and protect it between reboots. This generated gatekeeper storage key can also be transferred to other computing devices under certain Circumstances, as discussed in more detail below. In another implementation, platform firmware on a computing device generates a gatekeeper storage key according to a particular procedure that allows any previous gatekeeper storage keys to be obtained by the trusted core, but does not allow the trusted core to obtain any future gatekeeper storage keys; in this case an explicit seal/unseal step need not be performed.

Figure 6:
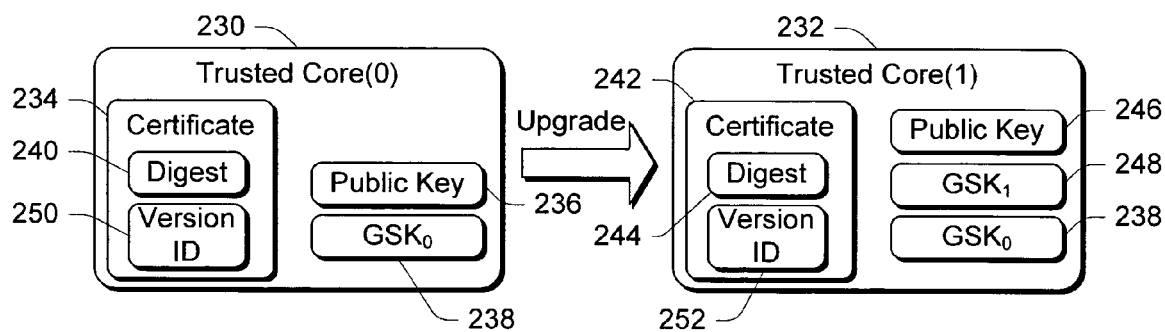
FIG. 6 illustrates an exemplary upgrade from one trusted core to another trusted core on the same client computing device.

With this secret storage structure based on the gatekeeper storage key, the trusted core on the client computing device may be upgraded to a new trusted core and these secrets maintained. FIG. 6 illustrates an exemplary upgrade from one trusted core to another trusted core on the same client computing device.

The initial trusted core executing on the client computing device is trusted core (0) 230, which is to be upgraded to trusted core (1) 232. Trusted core 230 includes (or corresponds to) a certificate 234, a public key 236, and a gatekeeper storage key 238 ($GSK_0$). Public key 236 is the public key of a public-private key pair of the component or device that is the source of trusted core 230 (e.g., the manufacturer of trusted core 230). Certificate 234 is digitally signed by the source of trusted core 230, and includes the digest 240 of trusted core 230. Similarly, trusted core 232 includes (or corresponds to) a certificate 242 including a digest 244, and a public key 246. After trusted core 230 is upgraded to trusted core 232, trusted core 232 will also include a gatekeeper storage key 248 ($GSK_1$), as well as gatekeeper storage key 238 ($GSK_0$). Optionally, trusted cores 230 and 232 may also include version identifiers 250 and 252, respectively.

Figure 7:
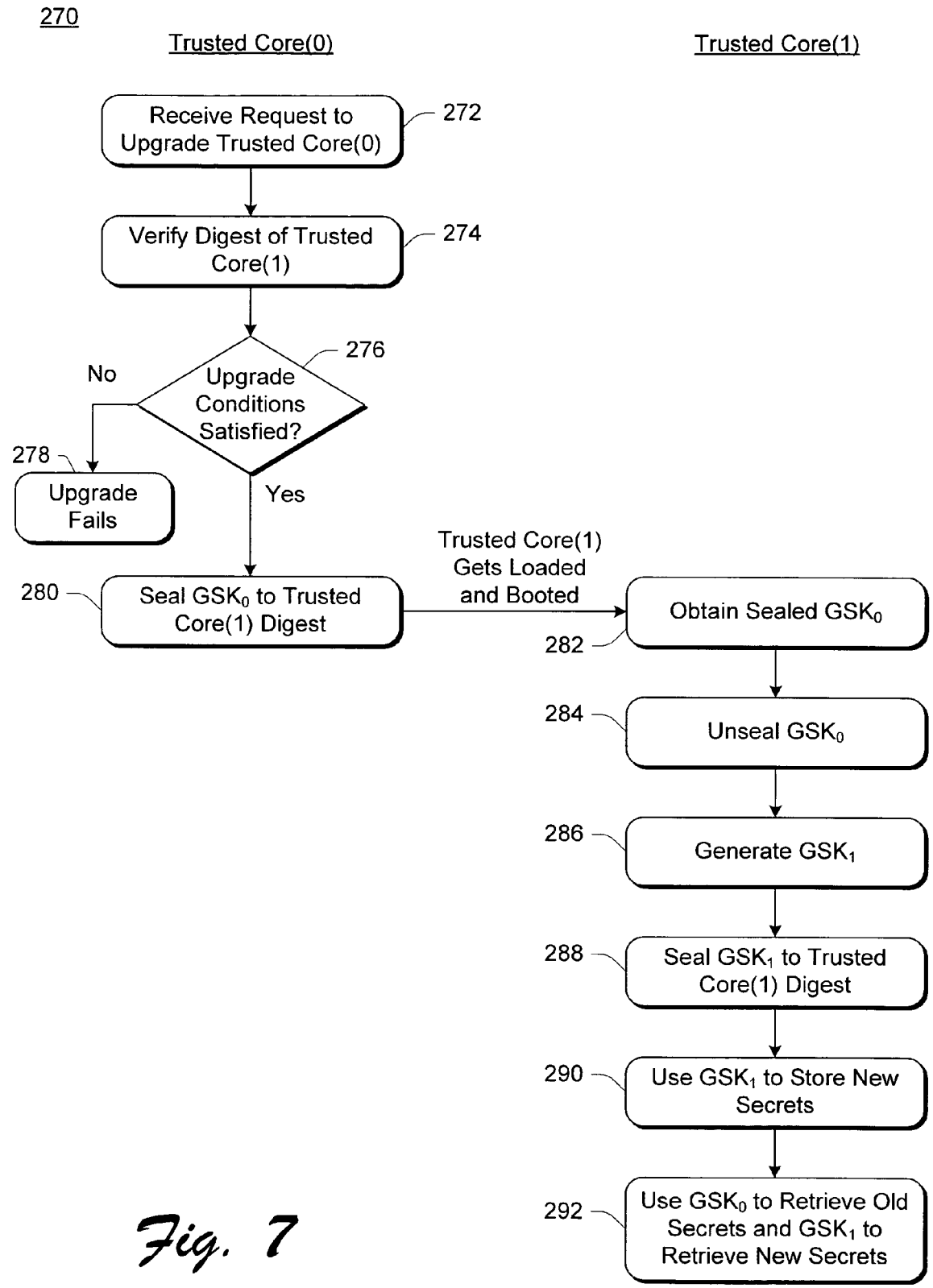
FIG. 7 illustrates an exemplary process for upgrading a trusted core.

FIG. 7 illustrates an exemplary process 270 for upgrading a trusted core which uses the seal/unseal primitives. The process of FIG. 7 is carried out by the two trusted cores. The process of FIG. 7 is discussed with reference to components of FIG. 6. For ease of explanation, the acts performed by the initial trusted core (trusted core (0)) are on the left-hand side of FIG. 7 and the acts performed by the new trusted core (trusted core (1)) are on the right-hand side of FIG. 7.

Initially, a request to upgrade trusted core (0) to trusted core (1) is received (act 272). The upgrade request is accompanied by the certificate belonging to the proposed upgrade trusted core (trusted core (1)). Trusted core (0) verifies the digest of proposed-upgraded trusted core (1) (act 274), such as by using public key 246 to verify certificate 242. Trusted core (0) also optionally checks whether one or more other upgrade conditions are satisfied (act 276). Any of a variety of upgrade conditions may be imposed. In one implementation, trusted core (0) imposes the restriction that trusted cores are upgraded in strictly increasing version numbers and are signed by the same certification authority as the one that certified the currently running trusted core (or alternatively signed by some other key known to by the currently running trusted core to be held by a trusted publisher). Thus, version 0 can only be replaced by version 1, version 1 can only be replaced by version 2, and so forth.

In most cases, it is also desirable to allow version 0 to be upgraded to version 2 in a single step (e.g., without having to be upgraded to version 1 in between). However, it is generally not desirable to allow "downgrades" to earlier versions (e.g., earlier versions may have more security vulnerabilities).

If the check in act 276 determines that the various conditions (including the verification of the digest in act 274) are not satisfied, then the upgrade process fails and the trusted core refuses to seal the gatekeeper storage key to the prospective-newer trusted core (act 278). Thus, even if the prospective-newer trusted core were to be installed on the computing device, it would not have access to any secrets stored by trusted core (0). However, if the various conditions are satisfied, then the upgrade process is authorized to proceed and trusted core (0) uses the Seal primitive operation to seal gatekeeper storage key 238 to the digest of trusted core (1) as stated in the certificate received in act 272 (act 280). In sealing the GSK 238 to the digest of trusted core (1), trusted core (0) uses the Seal operation with digest 244 being the digest_to_unseal parameter.

Once the Seal operation is completed, trusted core (1) may be loaded and booted. This may be an automated step (e.g., performed by trusted core (0)), or alternatively a manual step performed by a user or system administrator.

Once trusted core (1) is loaded and booted, trusted core (1) obtains the sealed gatekeeper storage key 238 (act 282). Trusted core (1) unseals gatekeeper storage key 238 (act 284), which it is able to successfully do as its digest 244 matches the digest_to_unseal parameter used to seal gatekeeper storage key 238. Trusted core(1) then generates its own gatekeeper storage key 248 (act 286) and seals gatekeeper storage key 248 to the trusted core (1) digest (act 288), thereby allowing gatekeeper storage key 248 to be subsequently retrieved by trusted core (1). Trusted core (1) may also optionally seal gatekeeper storage key 238 to the trusted core (1) digest. For subsequent requests by trusted applications to store secrets, trusted core (1) uses gatekeeper storage key 248 to securely store the secrets (act 290). For subsequent requests by trusted applications to retrieve secrets, trusted core (1) uses gatekeeper storage key 238 to retrieve old secrets (secrets that were sealed by trusted core (0)), and uses gatekeeper storage key 248 to retrieve new secrets (secrets that were sealed by trusted core (1)) (act 292).

Returning to FIG. 5, another way in which the gatekeeper storage key may be obtained (act 200) is by having the platform generate a set of one or more keys to be uses as gatekeeper storage keys. By way of example, the platform can generate a set of gatekeeper storage keys (SK) for trusted cores according to the following calculation:

$$SK_n = SHA\text{-}1(cat(BK, public\_key, n)), \text{ for } n=0 \text{ to } N$$

is where BK is a unique platform key called a binding key which is not disclosed to other parties, and is only used for the generation of keys as described above, public_key represents the public key of the party that generated the trusted core for which the gatekeeper storage keys are being generated, and N represents the version number of the trusted core. When booting a particular trusted core "n", the platform generates the family of keys from 1 to n and provide them to trusted core "n." Each time trusted core n boots, it has access to all secrets stored with key n (which is used as a GSK). But additionally, it has access to all secrets stored with previous versions of the trusted core, because the platform has provided the trusted core with all earlier secrets.

It should be noted, however, that the core cannot get access to secrets stored by future trusted cores because trusted core "n" obtains the family of keys 1 to n from the platform, but does not obtain key n+1 or any other keys beyond n. Additionally, secrets available to each family of trusted cores (identified by the public key of the signer of the trusted cores) are inaccessible to cores generated by a different software publisher that does not have access to the private key used to generate the certificates. The certificates are provided along with the trusted core (e.g., shipped by the publisher along with the trusted core), allowing the platform to generate gatekeeper storage keys for that publisher's trusted cores (based on the publisher's public key).

Figure 8:
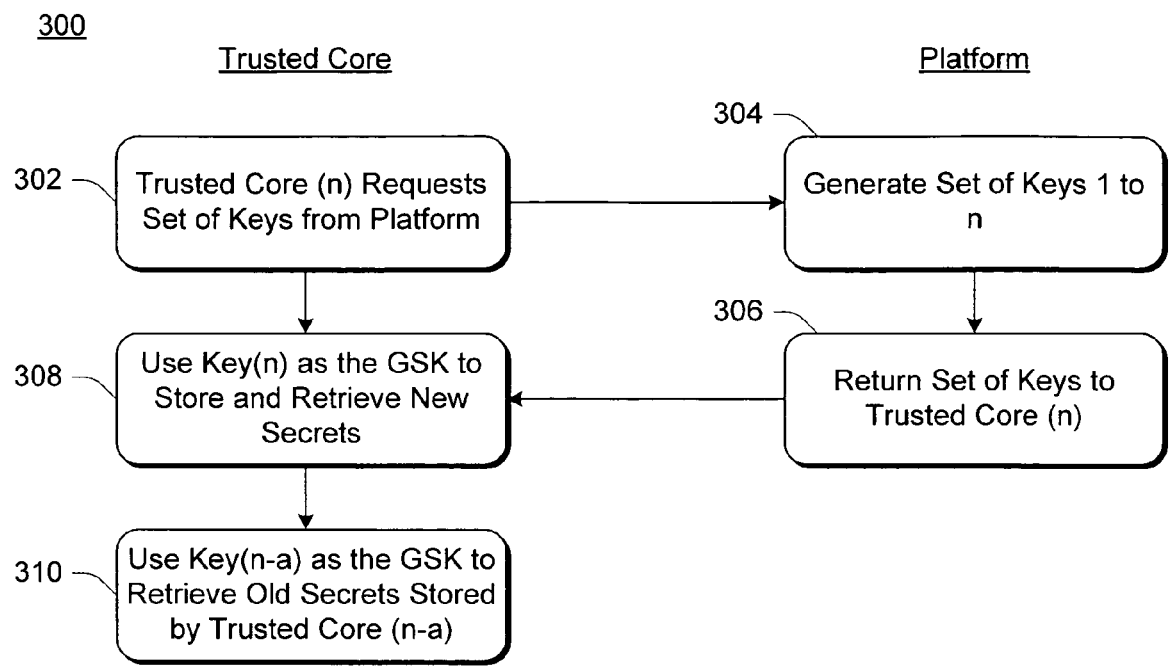
FIG. 8 illustrates another exemplary process for upgrading a trusted core.

FIG. 8 illustrates an exemplary process 300 for upgrading a trusted core which uses the family-based set of platform-generated gatekeeper storage keys. The process of FIG. 8 is carried out by the trusted core and the platform. For ease of explanation, the acts performed by the trusted core are on the left-hand side of FIG. 8 and the acts performed by the platform are on the right-hand side of FIG. 8.

Initially, trusted core (n) requests a set of keys from the platform (act 302). This request is typically issued when trusted core (n) is booted. In response to the request, the platform generates a set of keys from 1 to n (act 304) and returns the set of keys to trusted core (n) (act 306). Trusted core (n) eventually receives requests to store and/or retrieve secrets, and uses the received set of keys to store and retrieve such secrets. Trusted core (n) uses key (n) as the gatekeeper storage key to store and retrieve any new secrets (act 308), and uses key (n-a) as the gatekeeper storage key to retrieve any old secrets stored by a previous trusted core (n-a) (act 310).

It should be noted that the process of FIG. 8 is the process performed by a trusted core when it executes, regardless of whether it is a newly upgraded to trusted core or a trusted core that has been installed and running for an extended period of time. Requests to upgrade to new trusted cores can still be received and upgrades can still occur with the process of FIG. 8, but sealing of a gatekeeper storage key to the digest of the new trusted core need not be performed.

Following a successful upgrade (regardless of the manner in which gatekeeper storage keys are obtained by the trusted cores), trusted core (1) has a storage facility ($GSK_1$) that allows it to store new secrets that will be inaccessible to trusted core (0), and yet still has access to the secrets stored by trusted core (0) by virtue of its access to $GSK_0$. Furthermore, a user can still boot the older trusted core (0) and have access to secrets that it has stored, and yet not have access to newer secrets obtained by, or generated by trusted core (1).

Alternatively, rather than a single gatekeeper storage key, multiple gatekeeper storage keys may be used by a computing device. These additional second-level gatekeeper storage key(s) may be used during normal operation of the device, or alternatively only during the upgrade process. Using multiple gatekeeper storage keys allows trusted applications to prevent their secrets from being available to an upgraded trusted core. Some trusted applications may allow their secrets to be available to an upgraded trusted core, whereas other trusted applications may prevent their secrets from being available to the upgraded trusted core. Additionally, a particular trusted application may allow some of its secrets to be available to the upgraded trusted core, but not other secrets. In one implementation, when a trusted application stores a secret it indicates to the trusted core whether the secret should be accessible to an upgraded trusted core, and this indication is saved as part of the policy corresponding to the secret (e.g., policy 188, 190, or 192 of FIG. 4). The family of second-level gatekeeper storage keys can be generated randomly and held encrypted by the root (sealed) gatekeeper storage key. During the trusted core upgrade process, only those trusted application secrets that are to be accessible to an upgraded trusted core are encrypted so as to be retrievable by the upgraded trusted core. For example, the trusted core being upgraded can generate a temporary gatekeeper storage key and encrypt a subset of the trusted application secrets (all of the secrets that are to be retrievable by the upgraded trusted core) using the temporary gatekeeper storage key. The temporary gatekeeper storage key is then sealed to the digest of the new trusted core, but the other gatekeeper storage key used by the trusted core is not sealed to the digest of the new trusted core. Thus, when the new trusted core is loaded and booted, the new trusted core will be able to retrieve the temporary gatekeeper storage key and thus retrieve all of the trusted application secrets that were saved using the temporary gatekeeper storage key, but not trusted application secrets that were saved using the other gatekeeper storage key.

Thus, the trusted core upgrade process allows the new upgraded trusted core to access secrets that were securely stored by the previous trusted core(s), as the new upgraded trusted core has access to the gatekeeper storage key used by the previous trusted core(s). However, any other core (e.g., a mischievous core) would not have the same digest as the new upgraded trusted core, or would not have a valid certificate (digitally signed with the private key of the publisher of the new upgraded trusted core) with the public key of the publisher of the new upgraded trusted core, and thus would not have access to the secrets. Furthermore, if a previous trusted core were to be loaded and executed after secrets were stored by the new upgraded trusted core, the previous trusted core would not have access to the secrets stored by the new upgraded trusted core because the previous trusted core is not able to retrieve the gatekeeper storage key of the new upgraded trusted core. Additionally, the trusted core upgrade process allows the new upgraded trusted core to be authenticated to third parties. The security processor uses the digest of the new upgraded trusted core in performing any Quote or Unwrap/PK_Unseal primitive operations.

Hive Keys and Secret Migration

Secret use and storage by trusted applications executing on a client computing device 102 of FIG. 1 can be further based on multiple additional keys referred to as "hive" keys. The hive keys are used to facilitate migrating of trusted application secrets from one computing device to another computing device. In one implementation, up to three different types or classes of secrets can be securely stored: non-migrateable secrets, user-migrateable secrets, and third party-migrateable secrets. One or more hive keys may be used in a computing device 102 for each type of secret. Trusted application secrets are securely stored by encrypting the secrets using one of these hive keys. Which type of secret is being stored (and thus which hive key to use) is identified by the trusted application when storing the secret (e.g., is a parameter of the seal operation that the trusted core makes available to the trusted applications). Whether a particular trusted application secret can be migrated to another computing device is dependent on which type of secret it is.

Figure 9:
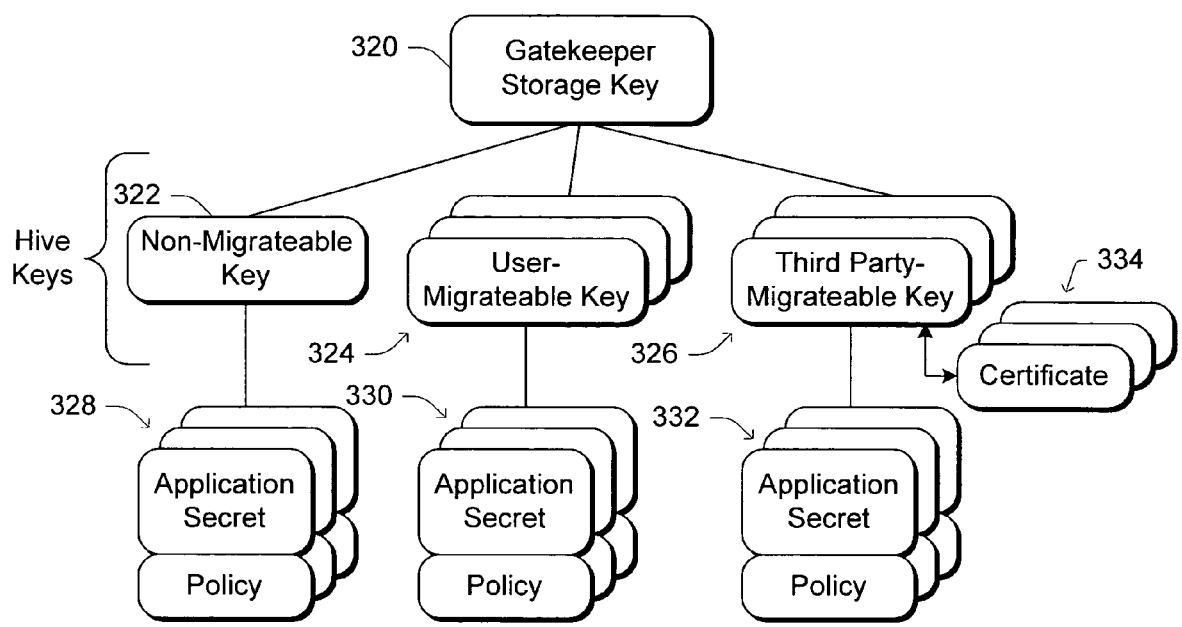
FIG. 9 illustrates an exemplary secret storage architecture employing hive keys.

FIG. 9 illustrates an exemplary secret storage architecture employing hive keys. A root gatekeeper storage key 320 and three types of hive keys are included: a non-migrateable key 322, one or more user-migrateable keys 324, and one or more third party-migrateable keys 326. Non-migrateable trusted application secrets 328 are encrypted by the trusted core using non-migrateable key 322, user-migrateable trusted application secrets 330 are encrypted by the trusted core using user-migrateable key 324, and third party-migrateable secrets 332 are encrypted by the trusted core using third party-migrateable key 326.

Each of the hive keys 322, 324, and 326, in turn, is encrypted by the trusted core using gatekeeper storage key 320, and the encrypted ciphertext stored. Thus, long as the trusted core can retrieve gatekeeper storage key 320, it can decrypt the hive keys 322, 324, and 326, and then use the hive keys to decrypt trusted application secrets 328, 330, and 332.

Non-migrateable secrets 328 are unconditionally non-migrateable—they cannot be transferred to another computing device. Non-migrateable secrets 328 are encrypted by an encryption algorithm that uses, as an encryption key, non-migrateable key 322. The trusted core will not divulge non-migrateable key 322 to another computing device, so no other device will be able to decrypt trusted application secrets 328. However, an upgraded trusted core (executing on the same computing device) may still be able to access trusted application secrets 328 because, as discussed above, the upgraded trusted core will be able to retrieve gatekeeper storage key 320. Although only a single non-migrateable key 322 is illustrated, alternatively multiple non-migrateable keys may be used.

User-migrateable secrets 330 can be migrated/transferred to another computing device, but only under the control or direction of the user. User-migrateable key 324 can be transferred, under the control or direction of the user, to another computing device. The encrypted trusted application secrets 330 can also be transferred to the other computing device which, so long as the trusted core of the other computing device has user-migrateable key 324, can decrypt trusted application secrets 330.

Multiple user-migrateable keys 324 may be used. For example, each trusted application that stores user-migrateable secrets may use a different user-migrateable key (thereby allowing the migration of secrets for different trusted applications to be controlled separately), or a single trusted application may use different user-migrateable keys for different ones of its secrets. Which user-migrateable key 324 to use to encrypt a particular trusted application secret is identified by the trusted application when requesting secure storage of the secret.

In one implementation, this user control is created by use of a passphrase. The user can input his or her own passphrase on the source computing device, or alternatively the trusted core executing on the source computing device may generate a passphrase and provide it to the user. The trusted core encrypts user-migrateable key 324 to the passphrase, using the passphrase as the encryption key. The ciphertext that is the encrypted trusted application secrets 330 can be transferred to the destination computing device in any of a variety of manners (e.g., copied onto a removable storage medium (e.g., optical or magnetic disk) and the medium moved to and inserted into the destination computing device, copied via a network connection, etc.).

The user also inputs the passphrase (regardless of who/ what created the passphrase) into the destination computing device. The encrypted user-migrateable key 324 can then be decrypted by the trusted core at the destination computing device using the passphrase. The trusted core at the destination device can then encrypt user-migrateable key 324 using the gatekeeper storage key of the trusted core at the destination device. Given user-migrateable key 324, the trusted core at the destination device is able to retrieve secrets securely stored using key 324, assuming that the trusted core executing on the destination device is not a different trusted core (or an earlier version of the trusted core) executing on the source device. The retrieval of secrets is based on a manifest, as discussed in more detail below.

The trusted core also typically authenticates the destination computing device before allowing the encrypted user-migrateable key 324 to be transferred to the destination computing device. Alternatively, at the user's discretion, authentication of the destination computing device may not be performed. The trusted core may perform the authentication itself, or alternatively rely on another party (e.g., a remote authentication party trusted by the trusted core) to perform the authentication or assist in the authentication.

The destination computing device can be authenticated in a variety of different manners. In one implementation, the quote and/or pk_unseal operations are used to verify that the trusted core executing on the destination computing device is the same as or is known to the trusted core executing on the source computing device (e.g., identified as or determined to be trustworthy to the trusted core on the source computing device). The authentication may also involve checking a list of "untrustworthy" certificates (e.g., a revocation list) to verify that the trusted core on the destination computing device (based on its certificate) has not been identified as being untrustworthy (e.g., broken by a mischievous user). The authentication may also optionally include, analogous to verifying the trustworthiness of the trusted core on the destination computing device, verifying the trustworthiness of the destination computing device hardware (e.g., based on a certificate of the hardware or platform), as well as verifying the trustworthiness of one or more trusted applications executing on the destination computing device.

Third party-migrateable secrets 332 can be migrated/transferred to another computing device, but only under the control or direction of a third party. This third party could be the party that provided the secret to the trusted application, or alternatively could be another party (such as a party that agrees to operate as a controller/manager of how data is migrated amongst devices). Examples of third party control include keys that control access to premium content (e.g., movies) etc., which may be licensed to several of a user's devices, and yet not freely movable to any other device, or credentials used to log on to a corporate LAN (Local Area Network), which can be moved, but only under the control of the LAN administrator. This third party could also be another device, such as a smartcard that tracks and limits the number of times the secret is migrated. Third party-migrateable key 326 can be transferred, under the control or direction of the third party, to another computing device. The encrypted trusted application secrets 332 can also be transferred to the other computing device which, so long as the trusted core of the other computing device has third party-migrateable key 326, can decrypt trusted application secrets 332 (assuming that the trusted core executing on the destination device is not a different trusted core (or an earlier version of the trusted core) executing on the source device).

In one implementation, this user control is created by use of a public-private key pair associated with the third party responsible for controlling migration of secrets amongst machines. Multiple such third parties may exist, each having its own public-private key pair and each having its own corresponding third party-migrateable key 326. Each third party-migrateable key 326 has a corresponding certificate 334 that includes the public key of the corresponding third party. Each time that a trusted application requests secure storage of a third party-migrateable secret, the trusted application identifies the third party that is responsible for controlling migration of the secret. If a key 326 already exists for the identified third party, then that key is used to encrypt the secret. However, if no such key already exists, then a new key corresponding to the identified third party is generated, added as one of keys 326, and is used to encrypt the secret.

In order to migrate a third party-migrateable secret, the trusted core encrypts the third party-migrateable key 326 used to encrypt that secret with the public key of the certificate 334 corresponding to the key 326. The ciphertext that is the encrypted trusted application secrets 332 can be transferred to the destination computing device in any of a variety of manners (e.g., copied onto a removable storage medium (e.g., optical or magnetic disk) and the medium moved to and inserted into the destination computing device, copied via a network connection, etc.). The encrypted third party-migrateable key 326 is also transferred to the destination computing device, and may be transferred along with (or alternatively separately from) the encrypted trusted application secrets 332.

The trusted core executing on the source computing device, or alternatively the third party corresponding to the encrypted third party-migrateable key, also typically authenticates the destination computing device before allowing the encrypted third party-migrateable key 326 to be transferred to the destination computing device. Alternatively, at the discretion of the third party corresponding to the encrypted third party-migrateable key, authentication of the destination computing device may not be performed. The trusted core (or third party) may perform the authentication itself, or alternatively rely on another party (e.g., a remote authentication party trusted by the trusted core or third party) to perform or assist in performing the authentication.

The trusted core executing on the destination computing device can then access the third party corresponding to the encrypted third party-migrateable key 326 in order to have the key 326 decrypted. The third party can impose whatever type of verification or other constraints that it desires in determining whether to decrypt the key 326. For example, the third party may require the trusted core executing on the destination computing device to authenticate itself, or may decrypt the key 326 only if fewer than an upper limit number of computing devices have requested to decrypt the key 326, or may require the user to verify certain information over the telephone, etc.

If the third party refuses to decrypt the key 326, then the destination computing device is not able to decrypt encrypted trusted application secrets 332. However, if the third party does decrypt the key 326, then the third party returns the decrypted key to the destination computing device. The decrypted key can be returned in a variety of different secure methods, such as via a voice telephone call between the user of the destination computing device and a representative of the third party, using network security protocols (such as HTTPS (Secure HyperText Transfer Protocol)), encrypting the key with a public key of a public-private key pair of the destination computing device, etc. The trusted core at the destination device can then encrypt third party-migrateable key 326 using the gatekeeper storage key of the trusted core at the destination device.

Storing application secrets based on classes or types facilitates the migration of the application secrets to other computing devices. Rather than using a separate key for each application secret, the application secrets are classed together, with only one key typically being needed for the user-migrateable class and only one key per third party typically being needed for the third party-migrateable class. Thus, for example, rather than requiring each user-migrateable secret to have its own key that needs to be transferred to the destination device in order to migrate the secrets to the destination device, only the single user-migrateable key need be transferred to the destination device. Additionally, an "tall" class can also exist (e.g., associated with gatekeeper storage key 320 of FIG. 9) that allows all of the secrets (except the non-migrateable secrets) to be migrated to the destination device by transferring and having decrypted only the gatekeeper storage key (which can in turn be used to decrypt the encrypted hive keys). The non-migrateable secrets can be kept from being migrated by not allowing the encrypted non-migrateable hive key to be copied.

Figure 10:
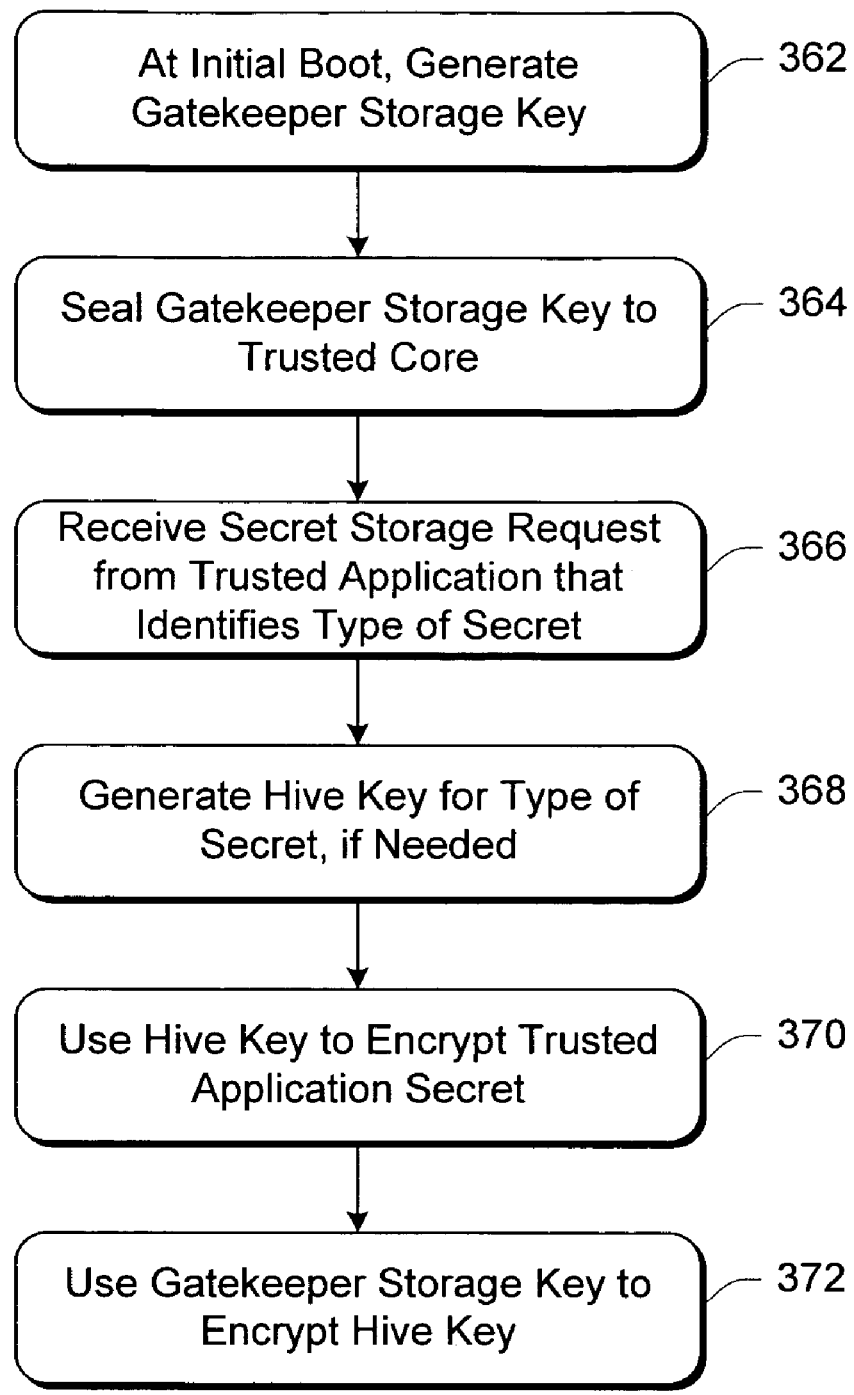
FIG. 10 illustrates an exemplary process for securely storing secrets using hive keys.

FIG. 10 illustrates an exemplary process 360 for securely storing secrets using hive keys. The process of FIG. 10 is carried out by the trusted core of a client computing device, and may be performed in software.

The first time the trusted core is booted, a gatekeeper storage key is generated (act 362) and sealed, using a cryptographic measure of the trusted core, to the trusted core (act 364). Eventually, a request to store a secret is received by the trusted core from a trusted application (act 366), and the request includes an identification of the type of secret (non-migrateable, user-migrateable, or third party-migrateable). The trusted core generates a hive key for that type of secret if needed (act 368). A hive key is needed if no hive key of that type has been created by the trusted core yet, or if the identified user-migrateable key has not been created yet, or if a hive key corresponding to the third party of a third party-migrateable secret has not been created yet.

Once the correct hive key is available, the trusted core uses the hive key to encrypt the trusted application secret (act 370). Additionally, the trusted core uses the gatekeeper storage key to encrypt the hive key (act 372).

Figure 11:
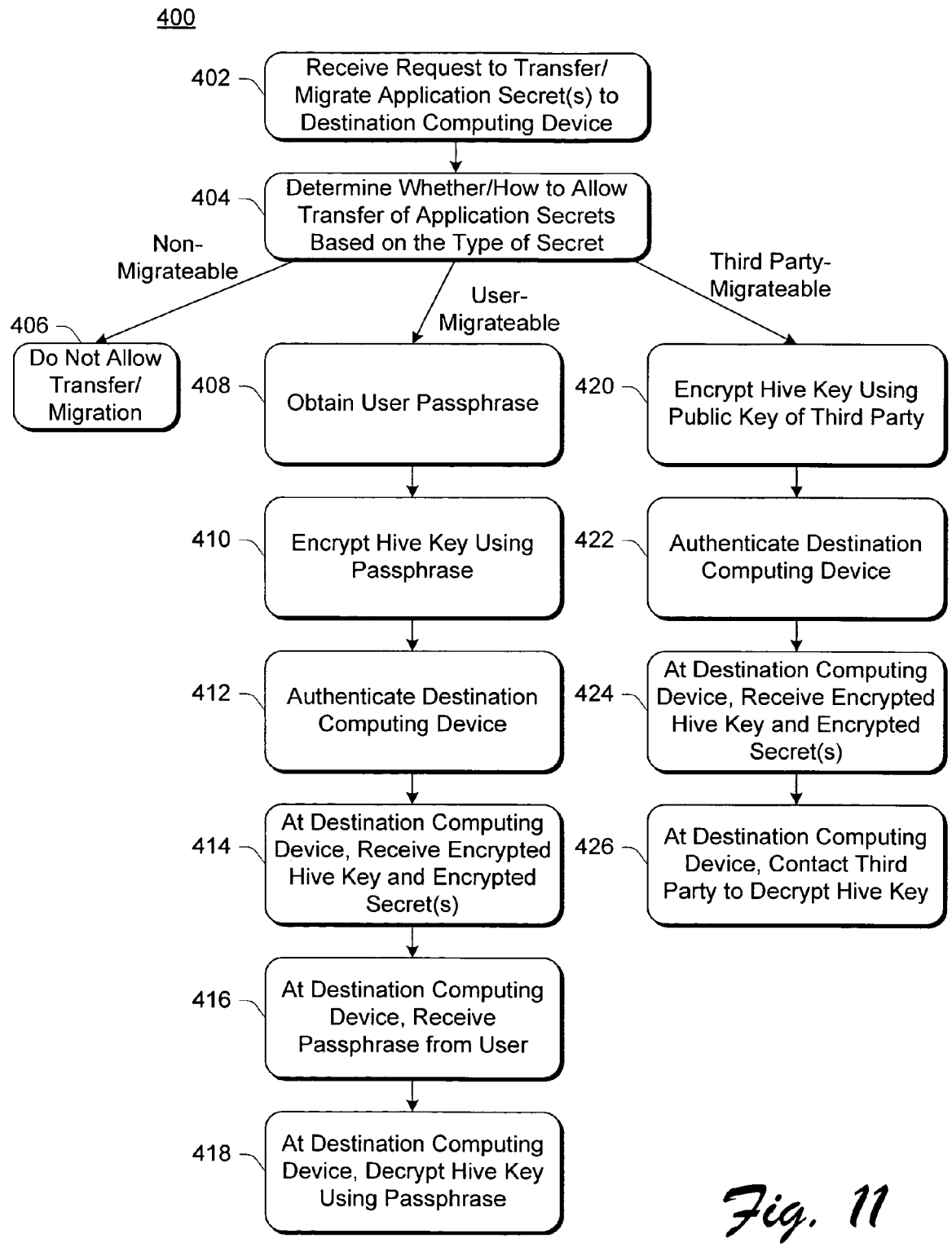
FIG. 11 illustrates an exemplary process for migrating secrets from a source computing device to a destination computing device.

FIG. 11 illustrates an exemplary process 400 for migrating secrets from a source computing device to a destination computing device. The process of FIG. 11 is carried out by the trusted cores on the two computing devices. The process of FIG. 11 is discussed with reference to components of FIG. 9.

Initially, a request to migrate or transfer secrets to a destination computing device is received at the source computing device (act 402). The trusted core on the source computing device determines whether/how to allow the transfer of secrets based on the type of secret (act 404). If the secret is a non-migrateable secret, then the trusted core does not allow the secret to be transferred or migrated (act 406).

If the secret is a user-migrateable secret, then the trusted core obtains a user passphrase (act 408) and encrypts the hive key corresponding to the secret using the passphrase (act 410). The trusted core also authenticates the destination computing device as being trusted to receive the secret (act 412). If the destination computing device is not authenticated, then the trusted core does not transfer the encrypted hive key to the destination computing device. Assuming the destination computing device is authenticated, the encrypted hive key as well as the encrypted secret is received at the destination computing device (act 414), and the trusted core at the destination computing device also receives the passphrase from the user (act 416). The trusted core at the destination computing devices uses the passphrase to decrypt the hive key (act 418), thereby allowing the trusted core to decrypt the encrypted secrets when requested.

If the secret is a third party-migrateable secret, then the trusted core on the source computing device encrypts the hive key corresponding to the secret using the public key of the corresponding third party (act 420). The trusted core on the source computing device, or alternatively the third party corresponding to the hive key, also authenticates the destination computing device (act 422). If the destination computing device is not authentication then the trusted core does not transfer the encrypted hive key to the destination computing device (or alternatively, the third party does not decrypt the hive key). Assuming the destination computing device is authenticated, the encrypted hive key as well as the encrypted secret is received at the destination computing device (act 424). The trusted core at the destination computing device contacts the corresponding third party to decrypt the hive key (act 426), thereby allowing the trusted core to decrypt the encrypted secrets when requested.

Thus, secure secret storage is maintained by allowing trusted processes to restrict whether and how trusted application secrets can be migrated to other computing devices, and by the trusted core enforcing such restrictions. Furthermore, migration of secrets to other computing devices is facilitated by the use of the gatekeeper storage key and hive keys, as only one or a few keys need to be moved in order to have access to the application secrets held by the source device. Additionally, the use of hive keys to migrate secrets to other computing devices does not interfere with the ability of the trusted applications or the trusted core to authenticate itself to third parties.

Backup of Secrets

Situations can arise where the hardware or software of a client computing device 102 of FIG. 1 is damaged or fails. Because of the possibility of such situations arising, it is generally prudent to backup the data stored on client computing device 102, including the securely stored secrets. However, care should be taken to ensure that the backup of the securely stored secrets does not compromise the security of the storage.

There are two primary situations that data backups are used to recover from. The first is the failure of the mass storage device that stores the trusted core (e.g., a hard disk) or the operating system executing on the computing device, and the second is the damaging of the device sufficiently to justify replacement of the computing device with a new computing device (e.g., a heavy object fell on the computing device, or a power surge destroyed one or more components).

In order to recover from the first situation (failure of the mass storage device or operating system), the contents of the mass storage device (particularly the trusted core and the trusted application secrets) are backed up when the computing device is functioning properly. Upon failure of the mass storage device or operating system, the mass storage device can be erased (e.g., formatted) or replaced, and the backed up data stored to the newly erased (or new) mass storage device. Alternatively, rather than backing up the trusted core, the computing device may have an associated "recovery" disk (or other media) that the manufacturer provides and that can be used to copy the trusted core from when recovering from a failure. When the computing device is booted with the backed up data, the trusted core will have the same digest as the trusted core prior to the failure, so that the new trusted core will be able to decrypt the gatekeeper storage key and thus the trusted application secrets.

In order to recover from the second situation (replacement of the computer), the backing up of securely stored secrets is accomplished in a manner very similar to the migration of secrets from one computing device to another. In the situation where the computing device 102 is damaged and replaced with another computing device, the backing up is essentially migrating the trusted application secrets from a source computing device (the old, damaged device) to a destination computing device (the new, replacement device).

Recovery from the second situation varies for different trusted application secrets based on the secret types. Non-migrateable secrets are not backed up. This can be accomplished by the trusted core not allowing the non-migrateable secrets to be copied from the computing device, or not allowing the non-migrateable key to be copied from the computing device, when backing up data.

User-migrateable secrets are backed up using a passphrase. During the backup procedure, a user passphrase(s) is obtained and used to encrypt the user-migrateable key(s), with the encrypted keys being stored on a backup medium (e.g., a removable storage medium such as a disk or tape, a remote device such as a file server, etc.). To recover the backup data, the user can copy the backed up encrypted trusted application secrets, as well as the user-migrateable key(s) encrypted to the passphrase(s), to any other device he or she desires. Then, by entering the passphrase(s) to the other device, the user can allow the trusted core to decrypt and retrieve the trusted application secrets.

Third party-migrateable secrets are backed up using a public key(s) of the third party or parties responsible for controlling the migration of the secrets. During the backup procedure, the trusted core encrypts the third party-migrateable key(s) with the public key(s) of the corresponding third parties, and the encrypted keys are stored on a backup medium (e.g., a removable storage medium such as a disk or tape, a remote device such as a file server, etc.). To recover the backup data, the user can copy the backed up encrypted trusted application secrets to any other device he or she desires, and contact the appropriate third party or parties to decrypt the encrypted keys stored on the backup medium. Assuming the third party or parties authorize the retrieval of the keys, the third party or parties decrypt the keys and return (typically in a secure manner) the third party-migrateable key(s) to the other computing device, which the trusted core can use to decrypt and retrieve the trusted application secrets.

Thus, analogous to the discussion of hive keys and secret migration above, trusted processes are allowed to restrict whether and how trusted application secrets can be backed up, and the trusted core enforces such restrictions. Additionally, the backing up of secrets does not interfere with the ability of the trusted applications or the trusted core to authenticate itself to third parties.

Manifests and Application Security Policies

Often times, trusted application components and modules are more likely to be upgraded than are components and modules of the trusted core. Trusted applications frequently include various dynamic link libraries (DLL's), plug-ins, etc. and allow for different software configurations, each of which can alter the binaries which execute as the trusted application. Using a digest for the trusted application can thus be burdensome as the digest would be changing every time one of the binaries for the trusted application changes. Thus, rather than using a digest for the trusted applications as is described above for the trusted core, a security model is defined for trusted applications that relies on manifests. A manifest is a policy statement which attempts to describe what types of binaries are allowed to be loaded into a process space for a trusted application. This process space is typically a virtual memory space, but alternatively may be a non-virtual memory space. Generally, the manifest specifies a set of binaries, is uniquely identifiable, and is used to gate access to secrets. Multiple manifests can be used in a computing device at any one time—one manifest may correspond to multiple different applications (sets of binaries), and one application (set of binaries) may correspond to multiple different manifests.

Figure 12:
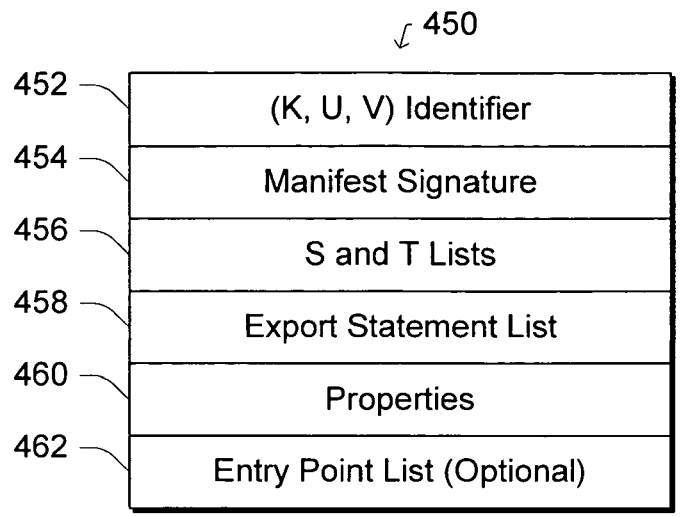
FIG. 12 illustrates an exemplary manifest corresponding to a trusted application.

FIG. 12 illustrates an exemplary manifest 450 corresponding to a trusted application. Manifest 450 can be created by anybody—there need not be any restrictions on who can create manifests. Certain trust models may insist on authorization by some given authority in order to generate manifests. However, this is not an inherent property of manifests, but a way of using them—in principle, no authorization is needed to create a manifest. Manifest 450 includes several portions: an identifier portion 452 made up of a triple (K, U, V), a signature portion 454 including a digital signature over manifest 450 (except for signature portion 454), a digest list portion 456, an export statement list portion 458, and a set of properties portion 460. An entry point list 462 may optionally be included.

Identifier portion 452 is an identifier of the manifest. In the illustrated example the manifest identifier is a triple (K, U, V), in which K is a public key of a public-private key pair of the party that generates manifest 450. U is an arbitrary identifier. Generally, U is a member of a set $M_u$, where the exact definition of $M_u$ is dependent upon the specific implementation. One condition on set $M_u$ is that all of its elements have a finite representation (that is, $M_u$ is countable). $M_u$ could be, for example, the set of integers, the set of strings of finite length over the Latin alphabet, the set of rational numbers, etc. In one implementation, the value U is a friendly name or unique identifier of the party that generates manifest 450. V is smaller to U, and can be a member of a set $M_v$ having the same conditions as $M_u$ (which may be the same set that U is a member of, or alternatively a different set). Additionally, there is an (total or partial) defined on the set $M_v$ (e.g., increasing numerical order, alphabetical order, or some arbitrarily defined order). In one implementation, V is the version number of manifest 450. The trusted application corresponding to manifest 450 is identified by the triple in portion 452.

Manifest identifier portion 452 is described herein primarily with reference to the triple (K, U, V). Alternatively, manifest identifiers may not include all three elements K, U, and V. For example, if version management is not needed, the V component can be omitted.

Alternatively, different manifest identifiers may also be used. For example, any of a variety of conventional cryptographic hashing functions (such as SHA-1) may be used to generate a hash of one or more portions of manifest 450 (e.g., portion 456). The resultant hash value can be used as the manifest identifier.

Signature portion 454 includes a digital signature over the portions of manifest 450 other than signature portion 454 (that is, portions 452, 456, 458, and 460). Alternatively, one or more other portions of manifest 450 may also be excluded from being covered by the digital signature, such as portion 458. The digital signature is generated by the party that generates manifest 450, and is generated using the private key corresponding to the public key K in portion 452. Thus, given manifest 450, a device (such as a trusted core) can verify manifest 450 by checking the manifest signature 454 using the public key K. Additionally, this verification may be indirected through a certificate chain.

Alternatively, a digital signature over a portion(s) of manifest 450 may not be included in manifest 450. The digital signature in portion 454 serves to tie lists portion 456 to the manifest identifier. In various alternatives, other mechanisms may be used to tie lists portion 456 to the manifest identifier. For example, if the manifest identifier is a hash value generated by hashing portion 456, then the manifest identifier inherently ties lists portion 456 to the manifest identifier.

Certificate lists 456 are two lists (referred to as S and T) of public key representations. In one implementation, lists 456 are each a list of certificate hashes. The S list is referred to as an inclusion list while the T list is referred to as an exclusion list. The certificate hashes are generated using any of a wide variety of conventional cryptographic hashing operations, such as SHA-1. List S is a list of hashes of certificates that certify the public key which corresponds to the private key that was used to sign the certificates in the chain that corresponds to the binaries that are authorized by manifest 450 to execute in the virtual memory space. A particular manufacturer (e.g., Microsoft Corporation) may digitally sign multiple binaries using the same private key, and thus the single certificate that includes the public key corresponding to this private key may be used to authorize multiple binaries to execute in the virtual memory space. Alternatively, a manufacturer can generate an entirely new key for each binary which is subsequently deleted. This will result in the same mechanism being used to identify a single, unique application as opposed to one from a family. The "hash-of-a-certificate" scheme is hence a very flexible scheme for describing applications or families of applications.

List T is a list of hashes of certificates that certify the public key which corresponds to the private key that was used to sign the certificates in the chain that corresponds to the binaries that are not authorized by manifest 450 to execute in the virtual memory space. List T may also be referred to as a revocation list. Adding a particular certificate to list T thus allows manifest 450 to particularly identify one or more binaries that are not allowed to execute in the virtual memory space. The entries in list T override the entries in list S. Thus, in order for a binary to be authorized to execute in a virtual memory space corresponding to manifest 450, the binary must have a certificate hash that is the same as a certificate hash in list S (or have a certificate that identifies a chain of one or more additional certificates, at least one of which is in list S) but is not the same as any certificate hash in list T. In addition, none of the certificates in the chain from the certificate in S to the leaf certificate that contains the hash of the binary can be contained in list T. If both of these conditions are not satisfied, then the binary is not authorized to execute in the virtual memory space corresponding to manifest 450.

The T list, in conjunction with the S list, can be used flexibly. For example, given an inclusion of all applications certified by a given root in the inclusion list (S), the exclusion list (T) can be used to exclude one or more applications that are known to be vulnerable or have other bugs. Similarly, given a certification hierarchy, with the root certificate on the inclusion list (S), the exclusion list (T) can be used to remove one or more of the child keys in the hierarchy (and binaries certified by them) that have been compromised.

Alternatively, other public key representations or encodings besides certificate hashes can be used as one or both of the S and T lists. For example, rather than certificate hashes, the S and T lists may be the actual certificates that certify the public keys which correspond to the private keys that were used to sign the certificates in the chains that correspond to the binaries that are authorized by manifest 450 to execute (the S list) or not execute (the T list) in the virtual memory space. By way of another example, the S and T lists may be just the public keys which correspond to the private keys that were used to sign the certificates in the chains that correspond to the binaries that are authorized by manifest 450 to execute (the S list) or not execute (the T list) in the virtual memory space.

Export statement list portion 458 includes a list of zero or more export statements that allow a trusted application secret associated with manifest 450 to be exported (migrated) to another trusted application on the same computing device. Each trusted application executing on a client computing device 102 of FIG. 1 has a corresponding manifest 450, and thus each trusted application secret securely saved by the trusted application is associated with manifest 450. Export statement list portion 458 allows the party that generates manifest 450 to identify the other trusted applications to which the trusted application secrets associated with manifest 450 can be exported and made available for retrieving.

Each export statement includes a triple (A, B, S), where A is the identifier (K, U, V) of the source manifest, B is the identifier (K, U, V) of the destination manifest, and S is a digital signature over the source and destination manifest identifiers. B may identify a single destination manifest, or alternatively a set of destination manifests. Additionally, for each (K, U) in B, a (possibly open) interval of V values may optionally be allowed (e.g., "version 3 and higher", or "versions 2 through 5"). The digital signature S is made using the same private key as was used to sign manifest 450 (in order to generate the signature in portion 454).

Export statements may be device-independent and thus not limited to being used on any particular computing device. Alternatively, an export statement may be device-specific, with the export statement being useable on only one particular computing device (or set of computing devices). This one particular computing device may be identified in different manners, such as via a hardware id or a cryptographic mechanism (e.g., the export statement may be encrypted using the public key associated with the particular computing device). If a hardware id is used to identify a particular computing device, the export statement includes an additional field which states the hardware id (thus, the issuer of the manifest could control on a very fine granularity who can move secrets).

Additionally, although illustrated as part of manifest 450, one or more export statements may be separate from, but associated with, manifest 450. For example, the party that generates manifest 450 may generate one or more export statements after manifest 450 is generated and distributed. These export statements are associated with the manifest 450 and thus have the same affect as if they were included in manifest 450. For example, a new trusted application may be developed after the manifest 450 is generated, but the issuer of the manifest 450 would like the new trusted application to have access to secrets from the application associated with the manifest 450. The issuer of the manifest 450 can then distribute an export statement (e.g., along with the new trusted application or alternatively separately) allowing the secrets to be migrated to the new trusted application.

If a user or trusted application desires to export trusted application secrets from a source trusted application to a destination trusted application, the trusted core checks to ensure that the manifest identifier of the desired destination trusted application is included in export statement list portion 458. If the manifest identifier of the desired destination trusted application is included in export statement list portion 458, then the trusted core allows the destination trusted application to have access to the source trusted application secrets; otherwise, the trusted core does not allow the destination trusted application to have access to the source trusted application secrets. Thus, although a user may request that trusted application secrets be exported to another trusted application, the party that generates the manifest for the trusted application has control over whether the secrets can actually be exported to the other trusted application.

Properties portion 460 identifies a set of zero or more properties for the manifest 450 and/or executing process corresponding to manifest 450. Various properties can be included in portion 460. Example properties include: whether the process is debuggable, whether to allow (or under what conditions to allow) additional binaries to be added to the virtual memory space after the process begins executing, whether to allow implicit upgrades to higher manifest version numbers (e.g., allow upgrades from one manifest to another based on the K and U values of identifier 452, without regard for the V value), whether other processes (and what other processes) should have access to the virtual memory space of the process (e.g. to support secure shared memory), what/whether other resources should be shareable (e.g. "pipe" connections, mutexes (mutually exclusives), or other OS resources), and so forth.

Entry point list 462 is optional and need not be included in manifest 450. In one implementation, an entry point list is included in the binary or a certificate for the binary, and thus not included in manifest 450. However, in alternative embodiments entry point list 462 may be included in manifest 450. Entry point list 462 is a list of entry points into the executing process. Entry point list 462 is typically generated by the party that generates manifest 450. These entry points can be stored in a variety of different manners, such as particular addresses (e.g., offsets relative to some starting location, such as the beginning address of a particular binary), names of functions or procedures, and so forth. These entry points are the only points of the process that can be accessed by other processes (e.g., to invoke functions or methods of the process). When a request to access a particular address in the virtual memory space of an executing process associated with manifest 450 is received, the trusted core checks whether the particular address corresponds to an entry point in entry point list 462. If the particular address does correspond to an entry point in entry point list 462, then the access is allowed; otherwise, the trusted core denies the access.

The manifest is used by the trusted core in controlling authentication of trusted application processes and access to securely stored secrets by trusted application processes executing on the client computing device. When referencing a trusted application process, the trusted core (or any other entity) can refer to its identifier (the triple K, U, V). The trusted core exposes versions of the Seal, Unseal, Quote, and Unwrap operations analogous to those primitive operations discussed above, except that it is the trusted core that is exposing the operations rather than the underlying hardware of the computing device, and the parameters may vary. In one implementation, the versions of the Seal, Unseal, Quote, and Unwrap operations that are exposed by the trusted core and that can be invoked by the trusted application processes are as follows.

The Seal operation exposed by the trusted core takes the following form:

Seal (secret, public_key (K), identifier, version, secret_type)

where secret represents the secret to be securely stored, public_key (K) represents the K component of a manifest identifier, identifier represents the U component of a manifest identifier, version represents the V value of a manifest identifier, and secret_type is the type of secret to be stored (e.g., non-migrateable, user-migrateable, or third party-migrateable). The manifest identifier (the K, U, and V components) is a manifest identifier as described above (e.g., with reference to manifest 450). The K and U portions of the manifest identifier refer to the party that generated the manifest for the process storing the secret, while the V portion refers to the versions of the manifest that should be allowed to retrieve the secret. In the general case, the (K,U,V) triple can be a list of such triples and the value V can be a range of values.

When the Seal operation is invoked, the trusted core encrypts the secret and optionally additional parameters of the operation using the appropriate hive key based on the secret_type. The encrypted secret is then stored by the trusted core in secret store 126 of FIG. 2 or 146 of FIG. 3 cryptographically bound to the associated rules (the list {(K,U,V)}), or alternatively in some other location.

The Unseal operation exposed by the trusted core takes the following form:

Unseal (encrypted_Secret)

where encrypted_secret represents the ciphertext that has encrypted in it the secret to be retrieved together with the (K, U, V) list that names the application(s) qualified to retrieve the secret. In response to the Unseal operation, the trusted core obtains the encrypted secret and determines whether to reveal the secret to the requesting process. The trusted core reveals the secret to the requesting process under two different sets of conditions; if neither of these sets of conditions is satisfied then the trusted core does not reveal the secret to the requesting process. The first set of conditions is that the requesting process was initiated with a manifest that is properly formed and is included in the (K, U, V) list (or the K, U, V value) indicated by the sealer. This is the common case: An application can seal a secret naming its own manifest, or all possible future manifests from the same software vendor. In this case, the same application or any future application in the family has automatic access to its secrets.

The second set of conditions allows a manifest issuer to make a specific allowance for other applications to have access to the secrets previously sealed with more restrictive conditions. This is managed by an export certificate, which provides an override that allows secrets to be migrated to other applications from other publishers not originally named in the (K, U, V) list of the sealer. To avoid uncontrolled and insecure migration, export lists should originate from the publisher of the original manifest. This restriction is enforced by requiring that the publisher sign the export certificate with the key originally used to sign the manifest of the source application. This signature requirement may also be indirected through certificate chains.

To process an export certificate, the trusted core is a) furnished with the manifest from the original publisher (i.e., the manifest issuer), b) furnished with the export certificate itself which is signed by the original publisher, and c) running a process that is deemed trustworthy in the export certificate. If all these requirements are met, the running process has access to the secrets sealed by the original process.

The Quote and Unwrap operations provide a way for the trusted core to authenticate to a third party that it is executing a trusted application process with a manifest that meets certain requirements.

The Unwrap operation uses ciphertext as its single parameter. A third (arbitrary) party initially generates a structure that includes five parts: a secret, a public_key K, an identifier U, a version V, and a hive_id. Here, secret represents the secret to be revealed if the appropriate conditions are satisfied, public_key K represents the public key of the party that needs to have digitally signed the manifest for the process, identifier U is the identifier of the party that needs to have generated the manifest for the process, version V is a set of zero or more acceptable versions of the manifest, and hive_id is the type of secret being revealed (e.g., non-migrateable, user-migrateable, or third party-migrateable). The party then encrypts this structure using the public key of the public-private key pair known to belong to a trustworthy trusted core (presumably because of certification of the public part of this key). The manner in which the trusted core gets this key is discussed in additional detail in U.S. patent application Ser. No. 09/227,611 entitled "Loading and Identifying a Digital Rights Management Operating System" and U.S. patent application Ser. No. 09/227,561 entitled "Digital Rights Management Operating System". A trusted application receives the ciphertext generated by the third party and invokes the Unwrap operation exposed by the trusted core.

The trusted core responds to the Unwrap operation by using its private key of the public-private key pair to decrypt the ciphertext received from the invoking party. The trusted core compares the conditions in or associated with the encrypted ciphertext to the manifest associated with the appropriate trusted application process. The appropriate trusted application process can be identified explicitly by the third party that generated the ciphertext being unwrapped, or alternatively inherently as the trusted application invoking the Unwrap operation (so the trusted core knows that whichever process invokes the Unwrap operation is the appropriate trusted application process). If the manifest associated with the process satisfies all of the conditions in the encrypted ciphertext, then the process is authorized to retrieve the secret, and the trusted core provides the secret to the process. However, if one or more of the conditions in the encrypted ciphertext are not satisfied by the manifest associated with the process, then the process is not authorized to retrieve the secret and the trusted core does not provide the secret to the process.

In addition to manifest-based conditions, the Unwrap operation may also have conditions on the data of the secret. If the conditions on the data (e.g., to verify its integrity) are not satisfied then the trusted core does not provide the secret to the process (even if the manifest conditions are satisfied). For example, the encrypted secret may include both the data of the secret and a cryptographic hash of the data. The trusted core verifies the integrity of the data by hashing the data and verifying the resultant hash value.

The Unwrap operation naming the manifest or manifests of the application(s) allowed to decrypt the secret allows a remote party to conveniently express that a secret should only be revealed to a certain application or set of applications on a particular host computer running a particular trusted core.

An alternative technique is based on the use of the quote operation, which allows an application value to be cryptographically associated with the manifest of the application requesting the quote operation. The quote operation associates an application-supplied value with an identifier for the running software. When previously introduced, the quote operation was implemented in hardware, and allowed the digest of the trusted core to be cryptographically associated with some trusted core-supplied data. When implemented by the trusted core on behalf of applications, the quote operation will generate a signed statement that a particular value X was supplied by a process running under a particular manifest (K, U, V), where the value X is an input parameter to the quote operation. The value X can be used as part of a more general authentication protocol. For example, such a statement can be sent as part of a cryptographic interchange between a client and a server to allow the server to determine that the client it is talking to is a good device running a trusted core, and an application that it trusts before revealing any secret data to it. The requesting party can analyze the manifest and make its own determination of whether it is willing to trust the process.

Figure 13:
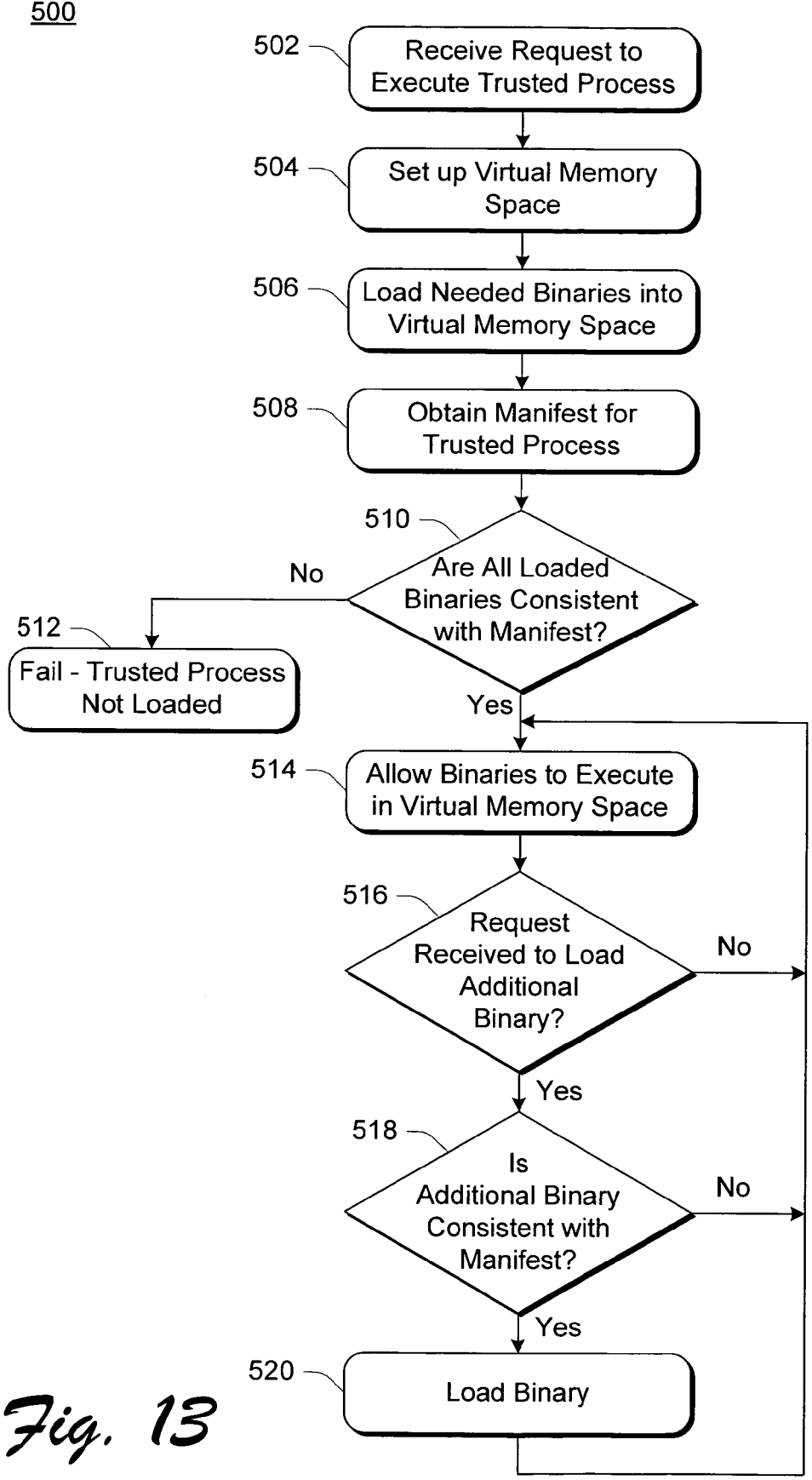
FIG. 13 illustrates an exemplary process for controlling execution of processes in an address space based on a manifest.

FIG. 13 illustrates an exemplary process 500 for controlling execution of processes in an address space based on a manifest. The process of FIG. 13 is discussed with reference to components in FIG. 12, and is implemented by a trusted core.

Initially, a request to execute a process is received by the trusted core (act 502). This request may be received from a user or alternatively another process executing on the same client computing device as the trusted core or alternatively on another computing device in communication with the client computing device. In response to the request, a virtual memory space for the process is set up by the trusted core (act 504) and the binaries necessary to execute the process are loaded into the virtual memory space (act 506). It should be noted that, in act 506, the binaries are loaded into the memory space but execution of the binaries has not yet begun. The trusted core then initializes the environment and obtains a manifest for the process (act 508). Typically, the manifest is provided to the trusted core as part of the request to execute the process.

The trusted core checks whether all of the loaded binaries are consistent with the manifest (act 510). In one implementation, this check for consistency involves verifying that the certificate (or certificate hash) of each binary is in the S list in portion 456 of manifest 450, and that certificates (or certificate hashes) for none of the binaries are in the T list in portion 456. This certificate verification may be indirected through a certificate list. If the loaded binaries are not consistent with the manifest (e.g., at least one is not in the S list and/or at least one is in the T list), then process 500 fails—the requested process is not executed (act 512).

However, if the loaded binaries are consistent with the manifest, then the trusted core allows the processor to execute the binaries in the virtual memory space (act 514). Execution of the loaded binaries typically is triggered by an explicit request from an outside entity (e.g. another process). A request may be subsequently received, typically from the executing process or some other process, to load an additional binary into the virtual memory space. The trusted core continues executing the process if no such request is received (acts 514 and 516). However, when such a request is received, the trusted core checks whether the additional binary is consistent with manifest 450 (act 518). Consistency in act 518 is determined in the same manner as act 510—the additional binary is consistent with manifest 450 if its certificate (or certificate hash) is in the S list in portion 456 of manifest 450 and is not in the T list in portion 456.

If the additional binary is not consistent with manifest 450, then the additional binary is not loaded into the virtual memory space and allowed to execute, and processing continues to act 514. However, if the additional binary is consistent with manifest 450, then the additional binary is loaded into the virtual memory space (act 520), and processing of the binaries (including the additional binary) continues.

Alternatively, rather than loading the binaries (act 506) and checking whether the loaded binaries are consistent with the manifest (act 510), the manifest can be obtained prior to loading the binaries into the virtual memory space (e.g., provided as part of the initial request to execute a trusted process in act 502). In this case, each request to load a binary is checked against the manifest. Binaries which are not allowed by the manifest are not loaded into the virtual memory space, whereas binaries that are allowed are loaded into the virtual memory space.

Figure 14:
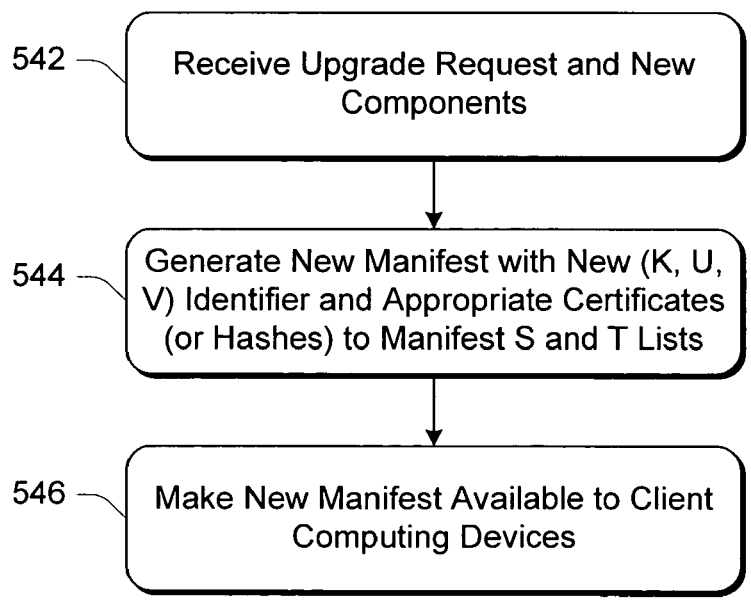
FIG. 14 illustrates an exemplary process for upgrading to a new version of a trusted application.

FIG. 14 illustrates an exemplary process 540 for upgrading to a new version of a trusted application. The process of FIG. 14 is discussed with reference to components in FIG. 12, and is implemented by a computing device (typically other than the client computing device). Typically, the upgraded version of a trusted application is prepared by the same party that prepared the previous version of the trusted application.

Initially, a trusted application upgrade request is received along with one or more new components or modules (e.g., binaries) for the trusted application to be upgraded (act 542). These new components or modules may replace previous versions of the components or modules in the previous version of the process, or alternatively may be new components or modules that have no counterpart in the previous version. A party begins generating a new manifest 450' for the new version of the trusted application including a new triple (K', U', V') identifier for the new version and appropriate certificate hashes (or alternatively certificates) in the appropriate S and T lists in portion 456 (act 544). Oftentimes (e.g., when the issuer of the new manifest is also the issuer of the old manifest and chooses K=K') the K' and U' parts of the triple will be the same as the K and U parts of the triple identifier of the previous version, so that only V and V' differ (that is, only the versions in the identifier differ). The new manifest 450' is then made available to the client computing device(s) where the new version of the trusted application is to be executed (act 546).

Generally, there are three situations for application upgrades. The first situation is where some binaries for the application are changed, added, and/or removed, but the old manifest allows the new binaries to be loaded and loading the old binaries is not considered to harm security. In this situation, the manifest does not have to change at all and no secrets have to be migrated. The user simply installs the new binaries on his machine and they are allowed to execute.

The second situation is where some binaries are changed, added, and/or removed, and the old manifest is no longer acceptable because some of the old binaries (which can still be loaded under the old manifest) compromise security and/or some of the changed or new binaries cannot be loaded under the old manifest. The issuer of the old manifest decides to issue a new manifest with the same K,U. Initially, the software manufacturer produces new binaries. These new binaries are digitally signed (certificates are issued) and a new manifest is created. This new manifest (via its S and T lists) allows the new binaries to be executed but does not allow the old binaries to be executed (at least not the binaries that compromise security). It should be noted that there is no inherent relationship between the S and T lists of the old manifest and the S and T lists of the new manifest. It should also be noted that, if the S list is completely changed in the new manifest, and some old binaries are re-used, the old binaries may need to be signed with a new private key.

A user then receives all three things (the new binaries, the certificates for the new binaries, and the new manifest) and installs all three on his or her machine. Secrets do not have to be migrated, because the new manifest is just a new version of the old one. The new binaries are allowed to execute, but the old binaries are not.

The third situation is where secrets have to be migrated between different applications that are not versions of each other. This situation is handled as described above regarding export statements.

Thus, secure secret storage is maintained by the trusted core imposing restrictions, based on the manifests, on which trusted processes can retrieve particular secrets. The manifests also provide a way for trusted applications to be authenticated to remote parties.

Exemplary Computing Device

Figure 15:
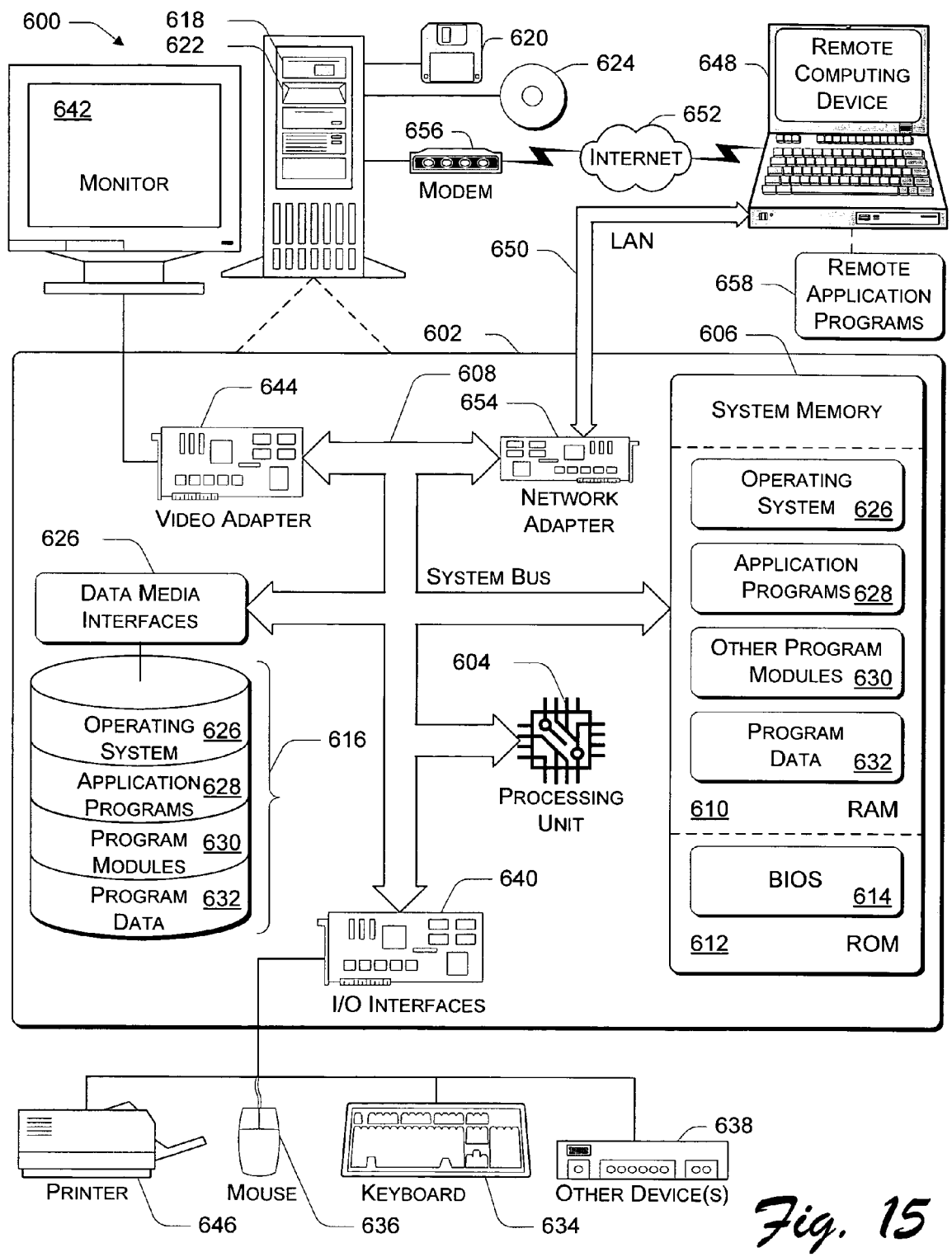
FIG. 15 illustrates a general exemplary computer environment, which can be used to implement various devices and processes described herein.

FIG. 15 illustrates a general exemplary computer environment 600, which can be used to implement various devices and processes described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the exemplary computer environment 600.

Computer environment 600 includes a general-purpose computing device in the form of a computer 602. Computer 602 can be, for example, a client computing device 102 or server device 104 of FIG. 1, a device used to generate a trusted application or manifest, etc. The components of computer 602 can include, but are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 15 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disc drive 622 for reading from and/or writing to a removable, non-volatile optical disc 624 such as a CD-ROM, DVD-ROM, or other optical media. The hard disk drive 616, magnetic disk drive 618, and optical disc drive 622 are each connected to the system bus 608 by one or more data media interfaces 626. Alternatively, the hard disk drive 616, magnetic disk drive 618, and optical disc drive 622 can be connected to the system bus 608 by one or more interfaces (not shown).

The various drives and their associated computer storage media provide non-volatile storage of computer readable instructions, data structures, program modules, and other data for computer 602. Although the example illustrates a hard disk 616, a removable magnetic disk 620, and a removable optical disc 624, it is to be appreciated that other types of computer readable media which can store data that is accessible by a computer, such as magnetic cassettes or other magnetic storage devices, flash memory cards, CD-ROM, digital versatile discs (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disc 624, ROM 612, and/or RAM 610, including by way of example, an operating system 626, one or more application programs 628 (e.g., trusted applications), other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

Computer 602 typically includes at least some form of computer readable media. Computer readable media can be any available media that can be accessed by computer 602. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other media which can be used to store the desired information and which can be accessed by computer 602. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described herein in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, and/or firmware. For example, one or more application specific integrated circuits (ASICs) could be designed or programmed to carry out the invention.

CONCLUSION

Thus, a security model a trusted environment has been described in which secrets can be securely stored for trusted applications and in which the trusted applications can be authenticated to third parties. These properties of the trusted environment are maintained, even though various parts of the environment may be upgraded or changed in a controlled way on the same computing device or migrated to a different computing device.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method of generating a new manifest to facilitate upgrading a trusted application on a computing device to a new trusted application, the method comprising:

receiving a request to upgrade the trusted application to the new trusted application;

receiving one or more new components to be included in the new trusted application;

generating a manifest for the new trusted application, wherein the manifest indicates that the one or more new components can be executed in a process space for the new trusted application, and wherein the manifest comprises:

a first portion including data representing a unique identifier of the new trusted application;

a second portion including data indicating whether a particular one or more binaries can be executed in the process space for the new trusted application; and a third portion that includes data representing an export statement that allows a secret associated with the new trusted application to be exported to a second trusted application, the export statement comprising an identifier of the manifest, an identifier of a manifest of the second trusted application, and a digital signature over the identifier of the manifest and the identifier of the manifest of the second trusted application; and making the manifest available to the computing device where the new trusted application is to be executed.

2. A method as recited in claim 1, further comprising:
digitally signing each of the one or more new components.

3. A method as recited in claim 1, further comprising:
making the manifest available to a trusted core of an operating system executing on the computing device.

4. A method as recited in claim 1, wherein the manifest further prevents one or more components of the trusted application from being loaded on the computing device.

5. A method as recited in claim 1, wherein the manifest further comprises:
a fourth portion derived from the data in both the first portion and the second portion by generating a digital signature over the first and second portions; and
a fifth portion that includes data representing a set of properties corresponding to the manifest.

6. A method as recited in claim 1, wherein the manifest further comprises a fourth portion that includes the identifier of the manifest, and wherein the identifier of the manifest includes:
a public key of a public-private key pair of a party that generates the manifest;
an identifier of the party that generates the manifest; and
a version number of the manifest.

7. A method as recited in claim 6, wherein:
the public key of the manifest is the same as a public key in the manifest identifier portion of an original manifest corresponding to the trusted application; and
the identifier of the party of the manifest is the same as an identifier, in the original manifest, of the party that generated the original manifest.

8. A method as recited in claim 1, wherein generating the manifest comprises:
adding, to the manifest, a list of one or more hashes of certificates that certify public keys which correspond to private keys that were used to sign the certificates that correspond to the one or more new components.

9. A method as recited in claim 1, wherein generating the manifest comprises:
adding, to the manifest, a list of one or more certificates that certify public keys which correspond to private keys that were used to sign the certificates that correspond to the one or more new components.

10. A method as recited in claim 1, further comprising:
adding, to the manifest, an indication of each of one or more additional components that cannot be executed in the process space.

11. A method as recited in claim 10, wherein adding, to the manifest, an indication of each of one or more additional components that cannot be executed in the process space, comprises:
adding, to the manifest, a list of one or more additional hashes of certificates that certify public keys which correspond to private keys that were used to sign the certificates that correspond to one or more additional components that are not authorized to execute in the process space.

12. A method as recited in claim 10, wherein adding, to the manifest, an indication of each of one or more additional components that cannot be executed in the process space, comprises:
adding, to the manifest, a list of one or more additional certificates that certify public keys which correspond to private keys that were used to sign the certificates that correspond to one or more additional components that are not authorized to execute in the process space.

13. A method as recited in claim 1, wherein the export statement Farther comprises a hardware identifier that identifies one or more computing devices on which the export statement can be used.

14. A method as recited in claim 1, wherein the manifest is digitally signed using a key, and wherein the digital signature over the identifier of the manifest and the identifier of the manifest of the second trusted application is generated using the key.

15. A method as recited in claim 1, further comprising encrypting the export statement using a public key of one or more computing devices on which the export statement can be used.

* * * * *